(12) United States Patent
Berbee et al.

(10) Patent No.: US 9,856,338 B2
(45) Date of Patent: Jan. 2, 2018

(54) PROCESSES TO PREPARE ETHYLENE-BASED POLYMERS USING A DISTRIBUTION OF CARBON MONOXIDE

(71) Applicant: Dow Global Technologies LLC, Midland, MI (US)

(72) Inventors: Otto J. Berbee, Hulst (NL); Teresa P. Karjala, Lake Jackson, TX (US); Stefan Hinrichs, Wondelgem (BE); James L. Cooper, Brazoria, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/311,527

(22) PCT Filed: Jun. 24, 2015

(86) PCT No.: PCT/US2015/037330
§ 371 (c)(1),
(2) Date: Nov. 16, 2016

(87) PCT Pub. No.: WO2015/200430
PCT Pub. Date: Dec. 30, 2015

(65) Prior Publication Data
US 2017/0114163 A1    Apr. 27, 2017

Related U.S. Application Data

(60) Provisional application No. 62/018,050, filed on Jun. 27, 2014.

(51) Int. Cl.
*C08G 67/02*   (2006.01)
*C08F 210/02*  (2006.01)
(Continued)

(52) U.S. Cl.
CPC .................... *C08F 210/02* (2013.01)

(58) Field of Classification Search
CPC ...................................... C08G 67/02
(Continued)

(56) References Cited

U.S. PATENT DOCUMENTS 3,334,081 A * 8/1967 Madgwick et al. .... C08F 10/00
526/208
3,676,401 A   7/1972 Henry
(Continued)

FOREIGN PATENT DOCUMENTS

EP    0230143 A1    7/1987
GB    1448062 A     9/1976
(Continued)

OTHER PUBLICATIONS

Ward, Ethylene-Carbon Monoxide Extrudable Adhesive Copolymers For Polyvinylidene Chloride, Tappi Journal, 1988, p. 140-144.
(Continued)

*Primary Examiner* — Fred M Teskin

(57) ABSTRACT

The invention provides a high pressure, free-radical polymerization process for polymerizing an ethylene-based polymer, said process comprising polymerizing ethylene, in a reactor configuration comprising a reactor with at least two reaction zones, a first reaction zone and a reaction zone located downstream from the first reaction zone; and wherein CO (carbon monoxide) is added to the reactor in at least one reaction zone located downstream from the first reaction zone, and wherein, less than, or equal to, 95 weight percent of the total amount of CO, is fed to the first reaction zone.

14 Claims, 5 Drawing Sheets

(51) Int. Cl.
*C08F 2/00* (2006.01)
*C08F 2/38* (2006.01)

(58) Field of Classification Search
USPC .......................................................... 528/392
See application file for complete search history.

(56) References Cited

U.S. PATENT DOCUMENTS

| | | | |
|---|---|---|---|
| 3,860,538 A | 1/1975 | Guillet et al. | |
| 4,714,741 A | 12/1987 | Balduff et al. | |
| 5,178,960 A | 1/1993 | Cook | |
| 5,962,164 A | 10/1999 | Lajeunesse | |
| 6,407,191 B1 | 6/2002 | Mezquita et al. | |
| 6,558,809 B1 | 5/2003 | Kelch et al. | |
| 7,338,038 B2 | 3/2008 | Maurer et al. | |
| 9,388,260 B2 | 7/2016 | Osby et al. | |
| 9,523,015 B2 | 12/2016 | Karjala et al. | |
| 2008/0242809 A1* | 10/2008 | Neuteboom et al. | C08F 210/02 526/64 |
| 2013/0237678 A1 | 9/2013 | Osby et al. | |
| 2016/0297904 A1 | 10/2016 | Berbee et al. | |
| 2016/0304643 A1 | 10/2016 | Eddy et al. | |
| 2017/0107315 A1 | 4/2017 | Osby et al. | |

FOREIGN PATENT DOCUMENTS

| | | |
|---|---|---|
| WO | 1991/18944 A1 | 12/1991 |
| WO | 1992/012185 A2 | 7/1992 |
| WO | 2011/071843 A1 | 6/2011 |
| WO | 2013/059042 A1 | 4/2013 |
| WO | 2013/078018 A2 | 5/2013 |
| WO | 2013/078224 A1 | 5/2013 |

OTHER PUBLICATIONS

Scott, Degradable Polymers, Principles and Applications, 1995, Chapter 8, p. 156-168.
PCT/US2015/037330, International Preliminary Report on Patentability dated Dec. 27, 2016.
PCT/US2015/037330, Written Opinion dated of Dec. 30, 2015.
PCT/US2015/037330, International Search Report dated Dec. 30, 2015.

* cited by examiner

PROCESSES TO PREPARE ETHYLENE-BASED POLYMERS USING A DISTRIBUTION OF CARBON MONOXIDE

REFERENCE TO RELATED APPLICATIONS

The present application claims the benefit of U.S. Provisional Application No. 62/018,050, filed Jun. 27, 2014, and incorporated herein by reference.

BACKGROUND

Conventional low density polyethylene (LDPE) is noted to have a desired balance of properties, which include good processability as defined by low motor load, minimal neck-in, which results in a reduction of waste due to edge trim, and the ability to be drawn to very low thicknesses at high line speeds. When used in extrusion coating and extrusion lamination applications, the desired level of adhesion is a requirement to meet the final package/article end use application. For most paper and paperboard applications, like gable top milk cartons, drink cups, sugar pouch and the like, having the ability to achieve fiber tear adhesion, at high line speeds, and/or fiber tear adhesion, at lowered coating/lamination temperatures, are desired.

Companies that extrusion coat a variety of polymers, including low density polyethylene (LDPE), onto paper and paperboard, continually have problems obtaining good "fiber tear" adhesion, which is the amount of adhesion required, to have an adhesion between the polymer to the paper greater than the adhesion of the paper fibers to themselves. When the polymer is pulled from a paper substrate, if fiber tear occurs, this adhesion is considered acceptable. If the polymer is pulled from the paper without fibers (without fiber tear), this is considered unacceptable adhesion. Improved adhesion is also desired in the extrusion lamination process, which is used to manufacture multilayer substrates. Ethylene-based polymers used for coatings and films are disclosed in the following references: International Publication Nos. WO 2011/071843, WO 1991/18944; U.S. Pat. Nos. 5,178,960, 3,860,538, 4,714,741, 6,558,809, 4,962,164, 3,676,401; GB 1448062; EP 0230143B1; Ward et al., *Ethylene-Carbon Monoxide Extrudable Adhesive Copolymers for Polyvinylidene Chloride*, June 1988 Tappi Journal, pp. 140-144; Scott et al., *Degradable Polymers, Principles and Applications*, Chapter 8: Ethylene-carbon monoxide copolymers, pp. 156-168, Chapman and Hall (1995). See also WO2014/105608, and U.S. Provisional 62/018,014 filed Jun. 27, 2014.

U.S. Pat. No. 6,407,191 discloses the use of carbonyl group containing chain transfer agents to obtain improved polymer processing and performance properties in extrusion processes and applications. The level of carbonyl group containing compound (ketones and aldehydes are claimed) ranges from 0.1 to 0.5 wt %. Production of high molecular weight polymers will restrict the level of ketonic or aldehydic chain transfer agents to be used to control the melt-index, and therefore the maximum level which can be incorporated in the polymer to 0.5 wt %.

It is a well known that, when running extrusion coating lines, at higher and higher line speeds, with conventional polymers, unacceptable fiber tear adhesion results. This adhesion is related to the oxidation of the molten polymer, as it exits the extrusion die, and before it comes in contact with the paper (or the time in the air gap). At higher line speeds, the molten polymer curtain has less time to oxidize, which can reduce adhesion. There is a need for new ethylene-based polymers that can be used in high speed extrusion coating lines, and which have good adhesion to paper substrates, and which can be used at lower melt temperatures, and/or at higher line speeds of the paper substrate. The polar nature of ECO copolymers provides improved adhesion over traditional LDPE for polar substrates, like paper, paperboard, foil, and metalized films.

International Publication No. WO 2013/059042 describes using fresh ethylene and/or CTA (chain transfer agent) feed distributions to broaden MWD and increase melt strength, while remaining process conditions are constant. International Publication No. WO 2013/078018 describes low density ethylene-based polymers with broad MWDs and low extractables, made in a tubular reactor, in the absence of an added crosslinking agent and/or comonomer with crosslinking capability.

International Publication WO 2013/078224 describes broad MWD, tubular LDPE resins with low extractables. The polymerization conditions need to be carefully selected and balanced to reduce extraction at higher molecular weights. Important process parameters include maximum polymerization temperatures, reactor pressure, and the type, level and distribution of the CTA.

There remains a need for new ethylene-based polymers that have improved adhesion to substrates. There is a further need for such polymers that can be made in a tubular reactor at low gel levels. There is a further need for such polymers that also have lower n-hexane extractable content. These needs have been met by the following invention.

SUMMARY OF THE INVENTION

The invention provides a high pressure, free-radical polymerization process for polymerizing an ethylene-based polymer, said process comprising polymerizing ethylene in a reactor configuration comprising a reactor with at least two reaction zones, a first reaction zone and a reaction zone located downstream from the first reaction zone; and wherein Carbon Monoxide (CO) is added to the reactor in at least one reaction zone located downstream from the first reaction zone, and wherein, less than, or equal to, 95 weight percent of the total amount of CO, is fed to the first reaction zone.

DETAILED DESCRIPTION

Figure 1:
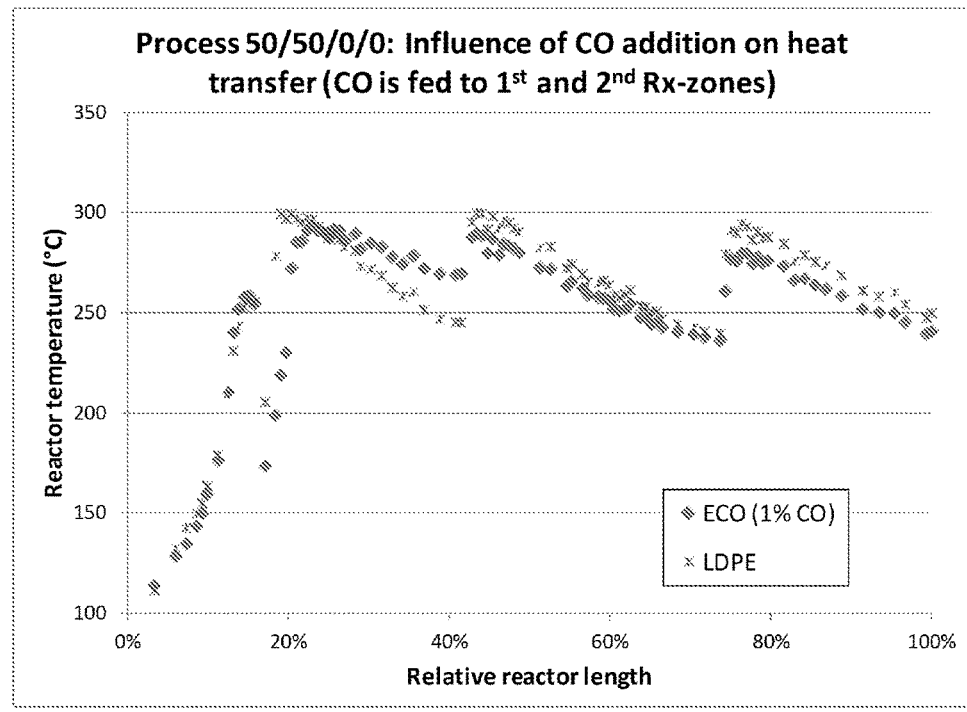
FIG. 1 depicts the influence of feeding CO on heat transfer.

As discussed above, the invention provides a high pressure, free-radical polymerization process for polymerizing an ethylene-based polymer, said process comprising polymerizing ethylene in a reactor configuration comprising a reactor with at least two reaction zones, a first reaction zone and a reaction zone located downstream from the first reaction zone, and wherein Carbon Monoxide (CO) is added to the reactor in at least one reaction zone located downstream from the first reaction zone, and wherein, less than, or equal to, 95 weight percent of the total amount of CO (added to the reactor), is fed to the first reaction zone.

An inventive process may comprise a combination of two or more embodiments as described herein.

The ethylene-based polymer may comprise a combination of two or more embodiments as described herein.

The term "reactor configuration," as used herein refers to the apparatus used in a polymerization process; for example, reactor types, compressors, feed configurations and separation vessels.

In one embodiment, less than, or equal to, 90 weight percent, further less than, or equal to, 80 weight percent, further less than, or equal to, 70 weight percent, further less than, or equal to, 60 weight percent, further less than, or equal to, 50 weight percent, of the total amount of CO, is fed to the first reaction zone.

In one embodiment, less than, or equal to, 40 weight percent, further less than, or equal to, 30 weight percent, further less than, or equal to, 20 weight percent, further less than, or equal to, 10 weight percent, of the total amount of CO, is fed to the first reaction zone.

In one embodiment, a first composition, comprising ethylene, is fed to one reaction zone, and a second composition, comprising ethylene, is fed to another reaction zone. In a further embodiment, each composition further comprises CO. In a further embodiment, the amount of CO in the first composition is different from the amount of CO in the second composition.

In one embodiment, the "concentration of CO" in the second composition is at least 1.2, further at least 1.4, further at least 1.6 times the concentration of CO in the first composition. The term "concentration of CO," as used herein, refers to the flow rate (kg/hr) of CO at the inlet of the reaction zone, relative to the cumulative flow rate of ethylene (kg/hr) at the inlet of the reaction zone.

In one embodiment, the "concentration of CO" in the second composition is at least 1.8, further at least 2.0, further at least 2.2 times the concentration of CO in the first composition.

In one embodiment, at least one reaction zone is operated at a maximum polymerization temperature from 305° C. to 320° C. The term "maximum polymerization temperature," or "peak polymerization temperature" as used herein, refers to the highest temperature reached in a reaction zone.

In one embodiment, at least one reaction zone is operated at a maximum polymerization temperature from 307° C. to 340° C.

In one embodiment, at least one reaction zone is operated at a maximum polymerization temperature from 310° C. to 340° C.

In one embodiment, an upstream reaction zone is operated at a maximum polymerization temperature that is at least 10° C. higher than the maximum polymerization temperature of a downstream reaction zone.

In one embodiment, the reactor configuration comprises at least one tubular reactor.

In one embodiment, the reactor comprises at least three reaction zones.

In one embodiment, the feed pressure to the first reaction zone is less than, or equal to, 250 MPa, further less than, or equal to, 240 MPa, further less than, or equal to, 230 MPa, further less than, or equal to, 220 MPa. The term "feed pressure," as used herein, refers to the inlet pressure of the first reaction zone.

In one embodiment, the reactor is a tubular reactor. In a further embodiment, the reactor comprises at least two, further at least three, reaction zones.

In one embodiment, at least one rheology modifying agents is added to at least one reaction zone, and wherein the Rheology Modifying Agent is selected from the following i) through vi):

i) RMA1:

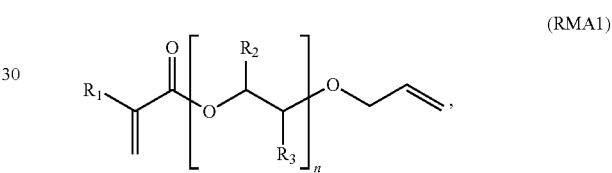
(RMA1)

wherein, for RMA1, $R_1$ is H or alkyl, further H or a C1-C3 alkyl, n is from 1 to 50, further from 1 to 20, and further from 1 to 10, $R_2$ is selected from H or an alkyl, further H or ethyl or methyl and further H or methyl, $R_3$ is selected from H or an alkyl, further from H or ethyl or methyl, and further H or methyl;

ii) RMA2:

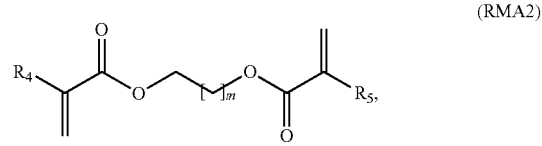
(RMA2)

wherein, for RMA2, $R_4$ and $R_5$ are each independently H or an alkyl, further H or methyl, m is from 1 to 50, further from 1 to 20, and further from 1 to 10;

iii) RMA3:

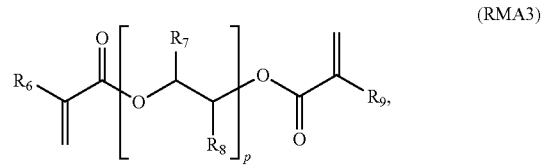
(RMA3)

wherein, for RMA3, $R_6$ and $R_9$ are each independently H or an alkyl, further H or ethyl or methyl, and further H or methyl, p is from 1 to 50, further from 1 to 20, and further from 1 to 10, $R_7$ is selected from H or an alkyl, further H or ethyl or methyl, and further H or methyl, $R_8$ is selected from H or an alkyl, further H or ethyl or methyl, and further H or methyl; and preferably $R_7$ and $R_8$ are selected from the group consisting of (i) $R_7$ and $R_8$ are both H, (ii) when $R_7$ is alkyl, then $R_8$ is H, and (iii) when $R_7$ is H, then $R_8$ is alkyl;

iv) RMA4:

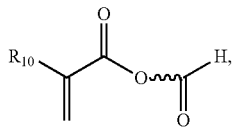

(RMA4)

wherein $R_{10}$ is hydrogen or an alkyl, further H or ethyl or methyl, and further H or methyl, the notation "∿∿∿" is a hydrocarbon chain comprising from 2 to 50 carbon atoms, further from 2 to 20 carbon atoms, and wherein the hydrocarbon chain is linear, branched, or comprises a saturated hydrocarbon ring structure;

v) RMA5:

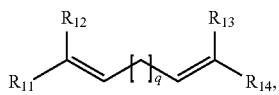

(RMA5)

wherein q is from 2 to 20; R11 is selected from H or alkyl, further H or ethyl or methyl, further H or methyl; R12 is selected from H or alkyl, further H or ethyl or methyl, further H or methyl; R13 is selected from H or alkyl, further H or ethyl or methyl, further H or methyl; R14 is selected from H or alkyl, further H or ethyl or methyl, further H or methyl; or vi) any combination of i) through v).

As used herein, the designation R1=$R_1$, R2=$R_2$, R3=$R_3$, and so forth.

Since the molecular weight of ethylene and carbon are the same (28.0 g/mole), the percent CO in ethylene is understood as the wt % or mole % of CO in ethylene.

In one embodiment, the desired incorporation and/or distribution of carbonyl groups in inter and intra polymer molecules is reached by the combination of the use of a fast reacting carbonyl containing comonomer (reactivity is equal or more than a factor 2 higher than ethylene), for instance alkyl acrylate and CO, and distributing the carbonyl containing comonomer over the reactor by means of distribution over the ethylene feed streams and/or direct injection(s) into the reactor.

In one embodiment, the desired incorporation and/or distribution of carbonyl groups in inter and intra polymer molecules is reached by the combination of the use of carbonyl containing comonomer with reactivity close to ethylene (reactivity is less than a factor 2 different from ethylene), for instance vinyl acetate, and distributing the carbonyl containing comonomer over the reactor by means of distribution of the recycle gas streams (containing comonomer) and the make-up ethylene streams over the reactor ethylene feed streams and/or direct injection(s) of make-up comonomer into the reactor.

The invention also provides an ethylene-based polymer formed from the process of any one of the previous claims.

In one embodiment, the ethylene-based polymer comprising monomer units derived from Carbon Monoxide, and wherein the polymer comprises the following features:

a) from 0.1 to 10, further from 0.2 to 7.0, further from 0.3 to 5.0 weight percent carbonyl (—C(O)—), as measured from 13C NMR signal range due to carbons, alpha to a ketone carbonyl (see 13C NMR test method below);

b) melt index (I2) from 1.0 to 50.0 g/10 min, further from 1.0 to 30.0 g/10 min;

c) G' (in Pa, at G" of 500 Pa, 170° C.)≥162−90*Log(MI).

In one embodiment, the ethylene-based polymer has a melting point, Tm, in ° C., which meets the following relationship: Tm (° C.)<601.4 ((cc/g°) C.)*(Density in g/cc)−447.8 (° C.).

In one embodiment, the ethylene-based polymer has a melting point, Tm, in ° C., that meets the following relationship: Tm (° C.)<601.4 (° C.·(cc/g))*(Density in g/cc)−449(° C.).

In one embodiment, the ethylene-based polymer has a melting temperature, Tm, greater than 107° C., as determined by DSC (peak temp.).

In one embodiment, the ethylene-based polymer has a melting temperature, Tm, from 105° C. to 108° C., as determined by DSC (peak temp.).

In one embodiment, the ethylene-based polymer has a G' (in Pa, at G" of 500 Pa, 170° C.) versus MI (or I2) relationship: G'≥162−90*Log(MI).

In one embodiment, the ethylene-based polymer has a G' (in Pa, at G" of 500 Pa, 170° C.) versus MI (or I2) relationship: G'≥168-90*Log(MI).

In one embodiment, the ethylene-based polymer has a density from 0.910 to 0.950 g/cc, further from 0.910 to 0.940 g/cc.

In one embodiment, the ethylene-based polymer has a density from 0.915 to 0.980 g/cc, further from 0.920 to 0.970 g/cc, further from 0.922 to 0.960 g/cc, and further from 0.925 to 0.950 g/cc.

In one embodiment, the ethylene-based polymer comprises overall carbonyl groups (—C(O)—) at an amount greater than, or equal to, 0.3 carbonyl per 1000 total carbons. For example, greater than, or equal to, 0.4 carbonyl per 1000 total carbons, further greater than, or equal to, 0.5 carbonyl per 1000 total carbons, further greater than 1.0 carbonyl per 1000 total carbons, further greater than 1.5 carbonyl per 1000 total carbons, further greater than, or equal to, 2.0 carbonyl per 1000 total carbons (backbone carbons plus carbons in branches), further greater than, or equal to, 2.5 carbonyl per 1000 total carbons, further greater than, or equal to, 3.0 carbonyl per 1000 total carbons, as determined by 13C NMR.

In one embodiment, the ethylene-based polymer comprises units derived from ethylene and units derived from Carbon Monoxide (CO). In a further embodiment, the ethylene-based polymer comprises units derived from an acrylate and/or a vinyl acetate.

In one embodiment, the ethylene-based polymer is a low density polyethylene comprising units derived from carbon monoxide (CO).

In one embodiment, the ethylene-based polymer comprises from 0.5 to 10.0 wt % CO, further from 0.5 to 8.0 wt % CO, further from 0.8 to 6.0 wt % CO, further from 1.0 to 4.0 wt % CO based on the weight of the polymer.

In one embodiment, the ethylene-based polymer comprises greater than, or equal to, 90 weight percent, further greater than, or equal to, 95 weight percent, polymerized ethylene, based on the weight of the polymer.

In one embodiment, the ethylene-based polymer comprises greater than, or equal to, 97 weight percent, further greater than, or equal to, 98 weight percent, polymerized ethylene, based on the weight of the polymer.

In one embodiment, the ethylene-based polymer comprises an amyl (C5) group level greater than, or equal to, 1.5 amyl groups per 1000 total carbon atoms, further greater than, or equal to, 1.6 amyl groups per 1000 total carbon atoms, as determined by 13C NMR.

In one embodiment, the ethylene-based polymer comprises, in polymerized form, ethylene and CO as the only monomer types. In a further embodiment, the ethylene-based polymer comprises a majority amount of polymerized ethylene, based on the weight of the polymer. In a further embodiment, the ethylene-based polymer comprises greater than, or equal to, 90 weight percent, further greater than, or equal to, 95 weight percent, polymerized ethylene, based on the weight of the polymer.

An inventive ethylene-based polymer may comprise a combination of two or more embodiments described herein.

The invention also provides a composition comprising an inventive ethylene-based polymer.

In one embodiment, the ethylene-based polymer is present at greater than, or equal to, 10 weight percent, further greater than, or equal to, 20 weight percent, further greater than, or equal to, 30 weight percent, further greater than, or equal to, 40 weight percent, further greater than, or equal to, 50 weight percent, further greater than, or equal to, 60 weight percent based on the weight of the composition.

In one embodiment, the ethylene-based polymer is present in an amount from 10 to 50 weight percent, further from 20 to 40 weight percent, based on the weight of the composition.

In one embodiment, the ethylene-based polymer is present in an amount from 60 to 98 weight percent, further from 65 to 95 weight percent, based on the weight of the composition.

An inventive composition may comprise a combination of two or more embodiments as described herein.

The invention also provides an article comprising at least one component formed from an inventive composition.

In one embodiment, the article is a film or a coating.

In one embodiment, the article is a coating for a cable or wire.

In one embodiment, the article is a coated sheet.

In one embodiment, the article is a coating for a cable or wire. In one embodiment, the cable or wire is an electrical or telecommunications wire or cable.

In one embodiment, the article is a coated sheet, and in a further embodiment the sheet is selected from a metal, a paper, or another polymer substrate or combinations thereof. In a further embodiment, the coated sheet is used in a wire or cable configuration.

In another embodiment, the coated sheet is used in a packaging application.

An inventive article may comprise a combination of two or more embodiments as described herein.

Process

For producing a highly branched ethylene-based polymer, a high pressure, free-radical initiated polymerization process is typically used. Two different high pressure free-radical initiated polymerization reactor types are known. In the first type, an agitated autoclave vessel having one or more reaction zones is used. The autoclave reactor normally has several injection points for initiator and/or monomer feeds. In the second type, a jacketed tube having one or more reaction zones is used as a reactor. Suitable, but not limiting, reactor lengths may be from 100 to 3600 meters (m), or from 1000 to 2800 m. The beginning of a reaction zone, for either type of reactor, is typically defined by the injection and/or activation of a free radical source, and the side injection of, ethylene, CTA (or telomer), comonomer(s), and any combination thereof. A high pressure process can be carried out in autoclave or tubular reactors having one or more reaction zones, or in a combination of autoclave and tubular reactors, each comprising one or more reaction zones.

In one embodiment, the inventive process takes place in a reactor configuration comprising a tubular reactor.

In an embodiment, the inventive process takes place in a reactor configuration comprising at least one autoclave and/or tubular reactor.

In one embodiment, the inventive process takes place in a reactor configuration comprising a tubular reactor and an autoclave reactor. In one embodiment, the tubular reactor is downstream from the autoclave reactor.

Often a CTA is used to control molecular weight. In one embodiment, one or more CTAs are added to an inventive polymerization process. CTAs typically comprise at least one of the following groups: alkanes, aldehydes, ketones, alcohol, ether, esters, mercaptan or phosphine. In a further embodiment, a CTA comprises at least one group of an alkane, an unsaturated hydrocarbon, a ketone, an aldehyde, an alcohol or ether. Preferably, a CTA is selected from the group consisting of saturated hydrocarbons, unsaturated hydrocarbons, ketones, aldehydes, alcohols, ethers, esters, mercaptans or phosphines. More preferably, a CTA is selected from the group consisting of saturated hydrocarbons, unsaturated hydrocarbons, ketones, aldehydes, alcohols and ethers. Exemplary CTAs include, but are not limited to, propylene, isobutane, n-butane, 1-butene, methyl ethyl ketone, acetone, ethyl acetate, propionaldehyde, ISOPAR-C, -E, and -H (ExxonMobil Chemical Co.), and isopropanol. In one embodiment, the amount of CTA used is from 0.03 to 10 weight percent based on the weight of the total reaction mixture.

In one embodiment, in which CTA is added to the polymerization, the ratio of the concentration of the CTA in the feed to reaction zone i, wherein i≥2, and reaction zone i is downstream from reaction zone 1, to the concentration of the CTA in the feed to reaction zone 1 is greater than or equal to than 1.0, or greater than 1.5, or greater than 2.

In one embodiment in which CTA is added to the polymerization, the ratio of the concentration of the CTA in the feed to reaction zone i, wherein i≥2, and reaction zone i is downstream from reaction zone 1, to the concentration of the CTA in the feed to reaction zone 1 is less than 1.0, or less than 0.8, or less than 0.6, or less than 0.4.

In one embodiment, the process includes a high pressure and low pressure recycle loop to improve ethylene efficiency, since ethylene is only partially converted or consumed per reactor pass. Typically, the conversion level per reactor pass is between 12% and 40%, with the conversion levels for tubular reactors at the higher end of this range, and the conversion levels for autoclave reactors at the lower end of this range.

In one embodiment, the polymerization may take place in a tubular reactor as described in International Application No. PCT/US12/059469, filed Oct. 10, 2012 (now WO2013/059042). This patent application uses a multi-zone reactor, and describes alternate locations of feeding fresh ethylene to control the ethylene to CTA ratio, and therefore polymer properties. Fresh ethylene may be simultaneously added in multiple locations, to achieve the desired ethylene to CTA ratio. In a similar way, addition of fresh CTA at addition points may be carefully selected to control polymer properties, as described in International Application No. PCT/US12/064284, filed Nov. 9, 2012 (now WO2013/078018). Fresh CTA may be simultaneously added in multiple locations, to achieve the desired CTA to ethylene ratio.

Likewise, the addition points and the amount of the fresh rheology modifying agent (branching agent), as described in this application, may be controlled, to control gel formation, while maximizing the desired property of increased melt strength and performance in targeted applications. In one embodiment, fresh rheology modifying agent may be simultaneously added in multiple locations, to achieve the desired rheology modifying agent to ethylene ratio. The use of a rheology modifying agent (branching and/or coupling agent) to broaden MWD, and to increase the melt strength of the polymer, will put further requirements on the distribution of the CTA and the rheology modifying agent along a reactor system, in order to achieve the desired change in product properties, without, or by minimizing, potential negative impacts like gel formation, reactor fouling, process instabilities, low efficiency of rheology modifying agent, etc.

In one embodiment, the polymerization takes place in at least one tubular reactor. In a multi-reactor system, the autoclave reactor usually precedes the tubular reactor. The addition points and amounts of fresh ethylene, fresh CTA, and fresh rheology modifying agent, may be appropriately controlled, to achieve the desired ratios of CTA to ethylene, and rheology modifying agent to ethylene, in the feeds to, and/or in, the reaction zones.

In one embodiment, the polymerization takes place in two reactors. In one embodiment, the polymerization takes place in one reactor with multiple or at least two reaction zones.

In one embodiment, the polymerization takes place in a reactor configuration comprising at least two reaction zones, reaction zone 1 and reaction zone i (i≥2), and wherein reaction zone i is downstream from reaction zone 1. In an embodiment, i is from 2 to 6, or from 2 to 5, or from 2 to 4. In an embodiment, i=2.

In one embodiment, the total number of reaction zones=n. In a further embodiment, n is from 1 to 20, further from 1 to 10, and further from 1 to 6. In a further embodiment, n is from 2 to 20, further from 2 to 10, and further from 2 to 6.

In one embodiment, the ethylene-based polymer comprises ethylene, CO, and, optionally, one or more other comonomers, and preferably one comonomer. Comonomers include, but are not limited to, α-olefins, vinylacetate, acrylates, methacrylates and anhydrides, each typically having no more than 20 carbon atoms. The α-olefin comonomers, which have a combined monomer and CTA functionality, may have 3 to 10 carbon atoms, or in the alternative, the α-olefin comonomers may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4 methyl-1-pentene and combinations thereof. Preferably, the α-olefin comonomers are selected from propylene, 1-butene and combinations thereof.

A free radical initiator, as used herein, refers to a free radical generated by chemical and/or radiation means. Exemplary free radical initiators include organic peroxides including, but not limited to, cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. In one embodiment, these organic peroxide initiators are used in an amount from 0.001-0.2 wt %, based upon the weight of polymerizable monomers.

In one embodiment, an initiator is added to at least one reaction zone and the initiator has a half-life temperature at one second greater than 255° C., preferably greater than 260° C. In a further embodiment, such initiators are used at a peak polymerization temperature from 320° C. to 350° C. In a further embodiment, the initiator comprises at least one peroxide group incorporated in a ring structure. Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723.

Photo-degradability of polymer can be enhanced by preferred incorporation of carbonyls in larger polymer molecules and more specifically in the internal backbones of these larger molecules. These preferred distributions can be established by the following four embodiments below.

In one embodiment, from 20 to 60 wt %, further from 40 to 60 wt % of the total ethylene feed, is fed to the first reaction zone, and greater than 80 wt %, further greater than 90 wt % of the total CO feed, is fed to the first reaction zone.

In one embodiment, from 50 to 80 wt % of the total ethylene feed, is fed to the first reaction zone, and greater than 80 wt %, further greater than 90 wt % of the total CO feed is fed to the first reaction zone.

In one embodiment, from 20 to 70 wt %, further from 40 to 70 wt % of the total ethylene feed, is fed to the first and second reaction zones, and greater than 80 wt %, further greater than 90 wt % of the total CO feed is fed to the first and second reaction zones.

In one embodiment, from 50 to 80 wt % of the total ethylene feed, is fed to the first and second reaction zones, and greater than 90 wt % of the total CO feed is fed to the first and second reaction zones.

A process for forming an ethylene-based polymer may comprise a combination of two or more embodiments as described herein.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10% of the combined weight of one or more additives, based on the weight of the inventive polymer.

In one embodiment the polymers of this invention are treated with one or more stabilizers, for example, antioxidants, such as IRGANOX 1010, IRGANOX 1076 and IRGAFOS 168. In general, the polymers are treated with one or more stabilizers before extrusion or other melt processes.

An inventive composition may further comprise at least one other polymer, in addition to an inventive ethylene-based polymer. Blends and mixtures of the inventive polymer with other polymers may be prepared.

Applications

The polymers, polymer blends and compositions of this invention may be employed in a variety of conventional thermoplastic fabrication processes, to produce useful articles, including extrusion coatings onto various substrates; monolayer and multilayer films; molded articles, such as blow molded, injection molded, or rotomolded articles; coatings; fibers; and woven or non-woven fabrics. The polymers, polymer blends and compositions of this invention can be used in applications, which require photodegradable polymers over time.

An inventive polymer may be used in a variety of films, including but not limited to, food packaging, consumer, industrial, agricultural (applications or films), lamination films, clarity shrink films, collation shrink films, stretch films, silage films, greenhouse films, fumigation films, liner films, stretch hood, heavy duty shipping sacks, pet food, sandwich bags, sealants, and diaper backsheets.

Definitions

Unless stated to the contrary, implicit from the context, or customary in the art, all parts and percents are based on weight, and all test methods are current as of the filing date of this application.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding), or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below. Trace amounts of impurities may be incorporated into and/or within the polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, at least one comonomer.

The term "ethylene-based interpolymer" refers to an interpolymer that comprises a majority amount of polymerized ethylene, based on the weight of the interpolymer, and at least one comonomer.

The term "ethylene-based copolymer" refers to a copolymer that comprises a majority amount of polymerized ethylene, based on the weight of the interpolymer, and a comonomer as the only monomer types.

The term "propylene-based polymer" refers to a polymer that comprises a majority amount of polymerized propylene, based on the weight of the polymer, and, optionally, at least one comonomer.

The term "alkyl," as used herein, refers to a saturated linear, cyclic, or branched hydrocarbon group. Nonlimiting examples of suitable alkyl groups include, for example, methyl, ethyl, n-propyl, i-propyl, n-butyl, t-butyl, i-butyl (or 2-methylpropyl), etc. In one embodiment, the alkyls each have 1 to 20 carbon atoms.

The term "hydrocarbon," as used herein, refers to an organic molecule containing only hydrogen and carbon atoms.

The term "high pressure, free radical polymerization process," as used herein, refers to a free radical polymerization process carried out at an elevated pressure of at least 1000 bar (100 MPa).

The term "reaction zone," as used herein, refers to a zone in a reactor, where the polymerization is first initiated by the addition of radicals or components which dissociate into, and/or generate, radicals. A reaction zone ends at the point where there is a new feed of radicals and/or components, which dissociate into, and/or generate, radicals, and optionally a feed of fresh and/or recycled ethylene and/or other components like CTA's, and/or comonomers.

The term "first reaction zone," as used herein, refers to the first reactor zone where the polymerization is first initiated by the addition of radicals or components which dissociate into, and/or generate, radicals. The first reaction zone ends at the point where there is a new feed of radicals and/or components, which dissociate into and/or generate, radicals, and optionally a feed of fresh and/or recycled ethylene and/or other components like CTA's, and/or comonomers.

The terms "subsequent reaction zone," "sequential reaction zone," or "reaction zone located downstream of the first reaction zone," as used herein, refer to a reactor zone which receives ethylene and polymer from a previous reactor zone, and where radicals or components, which dissociate into and/or generate, radicals, are added at the inlet of the subsequent (or sequential) reactor zone. The subsequent (or sequential) reaction zone ends at the point where there is a new feed of radicals and/or components, which dissociate into and/or generate, radicals, and optionally a feed of fresh and/or recycled ethylene and/or other components like CTA's, and/or comonomers; however, the nth reaction zone ends at the position of a pressure control device of the reactor system. The number of subsequent (or sequential) reaction zones is (n−1), where n is the total number of reaction zones.

The term "fresh," when used herein, in reference to a reactant (i.e., "fresh ethylene," "fresh rheology modifying agent"), refers to reactant provided from an external source(s), and not provided internally from a recycled source(s). For example, in an embodiment, fresh ethylene is used as "make-up ethylene" required to compensate for the ethylene consumed by the polymerization and/or lost through, for example, purge from the process and residual ethylene in the polymer.

The term "LCB frequency," as used herein, refers to the number of long chain branches (C6 and higher) formed per 500 ethylene molecules or 1000 carbon atoms incorporated in the formed polymer.

The term "SCB frequency," as used herein, reflects the number of short chain branches (C1, C2, C3, C4 and C5) formed per 500 ethylene molecules or 1000 carbon atoms incorporated in the formed polymer.

The term "locally-formed polymer," or "local formed polymer", as used herein, refers to a polymer product produced in a given reaction location. The locally-formed polymer may consist of new polymer molecules or new polymer added as long chain branches to already formed polymer molecules. The properties of this polymer might be depicted as function of reactor length or as percentage of the finally formed total polymer.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

Test Methods

Density

Samples for density measurements were prepared according to ASTM D 4703-10. Samples were pressed at 374° F. (190° C.), for five minutes, at 10,000 psi (68 MPa). The temperature was maintained at 374° F. (190° C.) for the above five minutes, and then the pressure was increased to 30,000 psi (207 MPa) for three minutes. This was followed by a one minute hold at 70° F. (21° C.) and 30,000 psi (207 MPa). Measurements were made within one hour of sample pressing using ASTM D792-08, Method B.

Melt Index

Melt index (I2 or $I_2$) was measured in accordance with ASTM D 1238-10, Condition 190° C./2.16 kg, Method A, and was reported in grams eluted per 10 minutes.

Nuclear Magnetic Resonance ($^{13}$C NMR)

Samples were prepared by adding approximately "3 g" of a "50/50 mixture of tetrachloroethane-d2/orthodichlorobenzene, containing 0.025 M Cr(AcAc)$_3$," to a "0.25 to 0.40 g" polymer sample, in a 10 mm NMR tube. Oxygen was removed from the sample by purging the tube headspace with nitrogen. The samples were dissolved and homogenized by heating the tube and its contents to 145-150° C. using a heating block and heat gun. Each sample was visually inspected to ensure homogeneity.

All data were collected using a Bruker 400 MHz spectrometer. The data was acquired using a six second pulse repetition delay, 90-degree flip angles, and inverse gated decoupling, with a sample temperature of 120° C. All measurements were made on non-spinning samples in locked mode. Samples were allowed to thermally equilibrate for seven minutes prior to data acquisition. The 13C NMR chemical shifts were internally referenced to the EEE triad at 30.0 ppm. The "C6+" value is a direct measure of C6+ branches in LDPE, where the long branches are not distinguished from "chain ends." The "32.2 ppm" peak, representing the third carbon from the end of all chains or branches of six or more carbons, is used to determine the "C6+" value. The level of CO units per 1000 C is determined as the integral of the peaks due to the ketone carbonyl, from about 42 to 43.5 ppm, divided by 2. In the ECO, the mol % CO and the wt % CO values are the same.

Mol % CO is calculated from the following equations: CO units/1000 C=moles CO per 1000 total polymer carbons, Moles ethylene=(1000−CO units/1000 C)/2, mol % CO=100*moles CO per 1000 total carbons/(moles CO+moles ethylene), Moles CO units per 1000 total carbons is calculate from Mol % CO as follows:

X=Mol % CO,

By definition, Mol % CO=X moles CO/(100−X) moles ethylene,

Y=Moles ethylene carbons=moles ethylene*2

CO/1000 C=[X/(X+Y)]*[1000/(X+Y)]

Total carbonyls are all carbonyls including those from carbon monoxide, chain transfer agents, esters, and so forth. When determining the overall (or total) carbonyl content, including carbonyl derived from carbon monoxide and other "carbonyl-containing compounds (for example, acrylates and vinyl acetate)," the signal frequencies corresponding to such compounds are also considered. Such frequencies are known by those or ordinary skilled in the art.

Nuclear Magnetic Resonance ($^1$H NMR)

Sample Preparation

The samples were prepared by adding approximately 130 mg of sample to "3.25 g of 50/50, by weight, tetrachlorethane-d2/perchloroethylene" with 0.001 M Cr(AcAc)$_3$, in a NORELL 1001-7, 10 mm NMR tube. The samples were purged by bubbling N2 through the solvent, via a pipette inserted into the tube, for approximately five minutes, to prevent oxidation. Each tube was capped, sealed with TEFLON tape, and then soaked at room temperature, overnight, to facilitate sample dissolution. The samples were kept in a N2 purge box, during storage, before, and after, preparation, to minimize exposure to O2. The samples were heated and vortexed at 115° C. to ensure homogeneity.

Data Acquisition Parameters

The 1H NMR was performed on a Bruker AVANCE 400 MHz spectrometer, equipped with a Bruker Dual DUL high-temperature CryoProbe, and a sample temperature of 120° C. Two experiments were run to obtain spectra, a control spectrum to quantitate the total polymer protons, and a double presaturation experiment, which suppressed the intense polymer backbone peaks, and enabled high sensitivity spectra for quantitation of the end-groups. The control was run with ZG pulse, 4 scans, SWH 10,000 Hz, AQ 1.64 s, D1 14 s. The double presaturation experiment was run with a modified pulse sequence, TD 32768, 100 scans, DS 4, SWH 10,000 Hz, AQ 1.64 s, D1 1 s, D13 13 s.

Data Analysis-1H NMR Calculations

The signal from residual 1H in TCE(Tetrachloroethane)-d2 (at 6.0 ppm) was integrated, and set to a value of 100, and the integral from 3 to −0.5 ppm was used as the signal from the whole polymer in the control experiment. For the presaturation experiment, the TCE signal was also set to 100, and the corresponding integrals for unsaturation (vinylene at about 5.40 to 5.60 ppm, trisubstituted at about 5.16 to 5.35 ppm, vinyl at about 4.95 to 5.15 ppm, and vinylidene at about 4.70 to 4.90 ppm) were obtained.

In the presaturation experiment spectrum, the regions for cis- and trans-vinylene, trisubstituted, vinyl, and vinylidene were integrated. The integral of the whole polymer from the control experiment was divided by two, to obtain a value representing X thousands of carbons (i.e., if the polymer integral=28,000, this represents 14,000 carbons, and X=14). The unsaturated group integrals, divided by the corresponding number of protons contributing to that integral, represent the moles of each type of unsaturation per X thousand carbons. Dividing the moles of each type of unsaturation by X, then gives the moles of unsaturated groups per 1000 moles of carbons.

Melt Strength

Melt strength measurements were conducted on a Gottfert Rheotens 71.97 (Göettfert Inc.; Rock Hill, S.C.), attached to a Gottfert Rheotester 2000 capillary rheometer. The melted sample (about 25 to 30 grams) was fed with a Göettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips, located 100 mm below the die, with an acceleration of 2.4 mm/s$^2$. The tensile force was recorded as a function of the take-up speed of the nip rolls. Melt strength was reported as the plateau force (cN) before the strand broke. The following conditions were used in the melt strength measurements: plunger speed=0.265 mm/second; wheel acceleration=2.4 mm/s$^2$; capillary diameter=2.0 mm; capillary length=30 mm; and barrel diameter=12 mm.

Hexane Extractables

Polymer pellets (from the polymerization, pelletization process without further modification) were pressed in a Carver Press, at a thickness of 3.0-4.0 mils (approximately 2.2 grams of pellets pressed into a film). The pellets were pressed at 190° C., for three minutes, at 3,000 lb$_f$, and then at 190° C., for three minutes, at 40,000 lb$_f$. Non-residue gloves (PIP*CleanTeam*Cotton Lisle Inspection Gloves, Part Number: 97-501) were worn, so as to not contaminate films with residual oils from the hands of the operator. Films were cut into "1 inch×1 inch" squares, and weighed. Enough film samples were used, such that "2.5 g" of film samples were used for each extraction. The films were then extracted for two hours, in a hexane vessel containing about 1000 ml of hexane, at "49.5±0.5° C." in a heated water bath. The hexane used was an isomeric "hexanes" mixture (for example, Hexanes (Optima), Fisher Chemical, High purity mobile phase for HPLC and/or extraction solvent for GC applications, 99.9% min by GC). After two hours, the films were removed, rinsed in clean hexane, initially dried with nitrogen, and then further dried in a vacuum oven (80±5° C.) at full vacuum (ISOTEMP Vacuum Oven, Model 281A at approximately 30 inches Hg) for two hours. The films were then placed in a desiccator, and allowed to cool to room temperature for a minimum of one hour. The films were then reweighed, and the amount of mass loss due to extraction in hexane was calculated. The [(amount of mass loss/initial weight of film)×100]=the weight percent of hexane extractable.

Triple Detector Gel Permeation Chromatography (TDGPC)—Conventional GPC Data

A Triple Detector Gel Permeation Chromatography (3D-GPC or TDGPC) system consisting of a Polymer Laboratories (now Agilent) high temperature chromatograph Model 220, equipped with a 2-angle laser light scattering (LS) detector Model 2040 (Precision Detectors, now Agilent), an IR-4 infra-red detector from Polymer Char (Valencia, Spain), and a 4-capillary solution viscometer (DP) (Viscotek, now Malvern) was used. Data collection was performed using Polymer Char DM 100 data acquisition box and related software (Valencia, Spain). The system was also equipped with an on-line solvent degassing device from Polymer Laboratories (now Agilent).

High temperature GPC columns consisting of four 30 cm, 20 um mixed A LS columns from Polymer Laboratories (now Agilent) were used. The sample carousel compartment was operated at 140° C., and the column compartment was operated at 150° C. The samples were prepared at a concentration of "0.1 grams of polymer in 50 milliliters of solvent." The chromatographic solvent and the sample preparation solvent was 1,2,4-trichlorobenzene (TCB) containing 200 ppm of 2,6-di-tert-butyl-4methylphenol (BHT). The solvent was sparged with nitrogen. The polymer samples were gently stirred at 160° C. for four hours. The injection volume was 200 microliters. The flow rate through the GPC was set at 1.0 ml/minute.

Column calibration and sample molecular weight calculations were performed using Polymer Char "GPC One" software. Calibration of the GPC columns was performed with 21 narrow molecular weight distribution polystyrene standards. The molecular weights of the polystyrene standards ranged from 580 to 8,400,000 g/mol, and were arranged in 6 "cocktail" mixtures, with at least a decade of separation between the individual molecular weights.

The peak molecular weights of polystyrene standards were converted to polyethylene molecular weights using the following equation (as described in Williams and Ward, J. Polym. Sci., Polym. Let., 6, 621 (1968)): $M_{polyethylene}$=A $(M_{polystyrene})^B$ here B has a value of 1.0, and the experimentally determined value of A is around 0.38 to 0.44.

The column calibration curve was obtained by fitting a first order polynomial to the respective polyethylene-equivalent calibration points obtained from the above Equation to the observed elution volumes.

Number, weight, and z-average molecular weights were calculated according to the following equations:

$$\overline{Mn} = \frac{\sum_i Wf_i}{\sum_i (Wf_i/M_i)}$$

$$\overline{Mw} = \frac{\sum_i (Wf_i * M_i)}{\sum_i Wf_i}$$

$$\overline{Mz} = \frac{\sum_i (Wf_i * M_i^2)}{\sum_i (Wf_i * M_i)},$$

where, $Wf_i$ is the weight fraction of the i-th component and $M_i$ is the molecular weight of the i-th component. The molecular weight distribution (MWD) was expressed as the ratio of the weight average molecular weight (Mw) to the number average molecular weight (Mn).

The A value was determined by adjusting the A value in the Williams and Ward Equation until Mw, the weight average molecular weight calculated using the above Equation, and the corresponding retention volume polynomial agreed with the independently determined value of Mw obtained in accordance with the linear homopolymer reference with known weight average molecular weight of 115, 000 g/mole.

Rheological G'

The sample used in the G' measurement was prepared from a compression molding plaque. A piece of aluminum foil was placed on a backplate, and a template or mold was placed on top of the backplate. Approximately 12 grams of resin was placed in the mold, and a second piece of aluminum foil was placed over the resin and mold. A second backplate was then placed on top of the aluminum foil. The total ensemble was put into a compression molding press, which was run at the following conditions: 3 min at 150° C., at 10 bar pressure, followed by 1 min at 150° C., at 150 bar, followed by a "1.5 min" quench cooling to room temperature, at 150 bar. A "25 mm disk" was stamped out of the compression-molded plaque. The thickness of this disk was approximately 2.0 mm.

The rheology measurement to determine G' was done in a nitrogen environment, at 170° C., and a strain of 10%. The stamped-out disk was placed between the two "25 mm" parallel plates located in an ARES-1 (Rheometrics SC) rheometer oven, which was preheated, for at least 30 minutes, at 170° C., and the gap of the "25 mm" parallel plates was slowly reduced to 1.65 mm. The sample was then allowed to remain for exactly 5 minutes at these conditions. The oven was then opened, the excess sample was carefully trimmed around the edge of the plates, and the oven was closed. The storage modulus and loss modulus of the sample were measured via a small amplitude, oscillatory shear, according to a decreasing frequency sweep from 100 to 0.1 rad/s (when able to obtain a G" value lower than 500 Pa at 0.1 rad/s), or from 100 to 0.01 rad/s. For each frequency sweep, 10 points (logarithmically spaced) per frequency decade were used.

The data were plotted (G' (Y-axis) versus G" (X-axis)) on a log-log scale. The Y-axis scale covered the range from 10 to 1000 Pa, while the X-axis scale covered the range from 100 to 1000 Pa. The Orchestrator software was used to select the data in the region where G" was between 200 and 800 Pa (or using at least 4 data points). The data were fit to a log polynomial model using the fit equation $Y=C1+C2 \ln(x)$. Using the Orchestrator software, G' at G" equal to 500 Pa was determined by interpolation. In some cases, the G' (at a G" of 500 Pa) was determined from test temperatures of 150° C. and 190° C. The value at 170° C. was calculated from a linear interpolation from the values at these two temperatures.

Differential Scanning calorimetry (DSC)

Differential Scanning calorimetry (DSC) was used to measure the melting and crystallization behavior of a polymer over a wide range of temperatures. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at about 175° C.; the melted sample was then air-cooled to room temperature (approx. 25° C.). The film sample was formed by pressing a "0.1 to 0.2 gram" sample at 175° C. at 1,500 psi, and 30 seconds, to form a "0.1 to 0.2 mil thick" film. A 3-10 mg, 6 mm diameter specimen was extracted from the cooled polymer, weighed, placed in a light aluminum pan (ca 50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C., and held isothermal for five minutes, in order to remove its thermal history. Next, the sample was cooled to −40° C., at a 10° C./minute cooling rate, and held isothermal at −40° C. for five minutes. The sample was then heated to 150° C. (this is the "second heat" ramp) at a 10° C./minute heating rate. The cooling and second heating curves were recorded. The cool curve was analyzed by setting baseline endpoints from the beginning of crystallization to −20° C. The heat curve was analyzed by setting baseline endpoints from −20° C. to the end of melt. The values determined were peak melting temperature (Tm), peak crystallization temperature (Tc), heat of fusion (Hf) (in Joules per gram), and the calculated % crystallinity for polyethylene samples using: % Crystallinity=((Hf)/(292 J/g))×100.

The heat of fusion (Hf) and the peak melting temperature were reported from the second heat curve. Peak crystallization temperature is determined from the cooling curve.

EXPERIMENTAL

Polymerization Simulations

A polymerization simulation model with applied reaction scheme and kinetics is described by Goto et al. (see below). Other reactor and product modeling frameworks are available through Aspen Plus of Aspen Technology, Inc., Burlington, Mass., USA; and PREDICT of Dr. Wulkow Computing in Technology GmbH (CiT), Rastede, Germany. Process and product responses, predicted by these model frameworks, are determined by the reactor parameters and the applied reaction scheme and kinetic parameters. The applied reaction scheme and kinetic parameters are described below.

The polymerization simulations were achieved with the Goto LDPE simulation model as described in the following: S. Goto et al.; *Journal of Applied Polymer Science: Applied Polymer Symposium*, 36, 21-40, 1981 (Title: *Computer model for commercial high pressure polyethylene reactor based on elementary reaction rates obtained experimentally*).

The kinetic data used by "Goto et al." was derived from high pressure free radical polyethylene polymerization experiments, performed at varying temperature, pressure and polymer concentration as described in the following: K. Yamamoto, M. Sugimoto; *Rate constant for long chain-chain branch formation in free-radical polymerization of ethylene; J. Macromol. Science-Chem.*, A13 (8), pp. 1067-1080 (1979). The following elementary reaction steps are described by Goto et al.: i) propagation of ethylene, ii) termination of radicals, iii) backbiting or SCB formation, iv) transfer to polymer or LCB formation, v) beta elimination of secondary radicals leading to vinyl formation, and vi) beta elimination of tertiary radicals leading to vinylidene formation.

See Table 1 for kinetic data for main reactions, where ko is the pre-exponential or frequency factor; Ea is the activation energy, reflecting the temperature dependence; and ΔV is the activation volume, reflecting the pressure dependence. All kinetic constants are from Goto et al., except the ko, Ea and ΔV values for backbiting, which have been optimized to better reflect the level of methyl branches (as analyzed by the $^{13}$C NMR technique) in high pressure polyethylene, as a function of pressure and temperature conditions.

TABLE 1

Kinetic Constants for Main Reactions

| Reaction | ko | Ea | ΔV |
|---|---|---|---|
| Units | m³/hr/kgmol | cal/mol | cc/mol |
| Propagation | 5.63E+11 | 10,520 | −19.7 |
| Termination | 3.0E+11 | 3,000 | 13.0 |
| Backbiting | 2.6E+12 | 12,130 | −14.0 |
| Transfer to Polymer | 1.75E+12 | 14,080 | 4.4 |
| Beta Elimination of Secondary Radical | 5.82E+11 | 15,760 | −22.6 |
| Beta Elimination of Tertiary Radical | 8.51E+10 | 14,530 | −19.7 |

The kinetic data for selected CTAs is given in Table 2. The kinetic constants were calculated with the kinetic constants of the Cs-value (ks/kp), as determined by Mortimer (see references after Table 3), and the ethylene propagation kinetics as given by Goto et al. (see Table 1 above).

The rheology modifying agents have been modeled as bifunctional agents having a carbon-carbon double bond A and a carbon-carbon double bond B, or as a monomeric CTA. This does not exclude the potential use of multifunctional components having multiple monomeric and/or CTA functional groups.

The rheology modifying agents have been described, and modeled, through assigning kinetic $r_1$ and $r_2$ reactivity ratios (see Tables 2 and 3 below). The kinetic $r_1$ and $r_2$ reactivity ratios are, by definition, linked to the ethylene propagation kinetics for their temperature (Ea) and pressure ($\Delta V$) dependencies. The simulations examples do not show the use of the rheology modifying agents, however the rheology modifying agents can be used in combination with the simulated and/or claimed process conditions, in order to further to enhance the rheological properties like G', beyond the lower claim boundary for G' (for example, see claim 13). The additional use of a rheology modifying agent is very helpful for producing blend resins for application, where the final rheological performance, like high melt strength and high G' values, is achieved by the application of the inventive ethylene-CO copolymer.

TABLE 2

Kinetic Constants for Selected CTAs

| | Chain Transfer to Modifier | | | Reactivity Ratios | |
|---|---|---|---|---|---|
| Component | kao m$^3$/hr/kgmol | Ea cal/mol | $\Delta V$ cc/mol | $r_1$ ($k_{11}/k_{12}$) | $r_2$ ($k_{22}/k_{21}$) |
| Propylene (CTA) | 2.20E+11 | 13,220 | −16.7 | 3.10 | 0.77 |
| Propionaldehyde (CTA) | 1.07E+11 | 9,720 | −8.4 | 0.00 | 0.00 |
| Isobutane (CTA) | 3.51E+11 | 14,020 | −16.7 | 0.00 | 0.00 |
| Monomeric CTA | 1.41E+12 | 10,520 | −19.7 | 0.08 | 12.5 |

TABLE 3

Reactivity Ratios for Rheology Modifying Agents (Bifunctional Model Components)

| | | Reactivity Ratios | | |
|---|---|---|---|---|
| | | $r_{1B}/r_{1A}$ | $r_1$ ($k_{11}/k_{12}$) | $r_2$ ($k_{22}/k_{21}$) |
| RMA2 or RMA3 | Bond A | 1 | 0.08 | 12.50 |
| (Sym bi-acrylate) | Bond B | | 0.08 | 12.50 |
| RMA1 (Asym-acrylate) | Bond A | 5 | 0.08 | 12.50 |
| | Bond B | | 0.40 | 2.50 |
| RMA5 (HC diene) | Bond A | 1 | 1 | 1 |
| | Bond B | | 1 | 1 |

Sym bi-acrylate = symmetrical bi-acrylate or bi-methacrylate
Asym-acrylate = asymmetrical acrylate or methacrylate
HC diene = hydrocarbon diene Chain transfer activity and comonomer reactivity scheme data are described in the following: P. Ehrlich, G. A. Mortimer, *Fundamentals of the free radical polymerization of ethylene*, Adv. Polymer Sci., Vol. 7, 386-448 (1970); G. Mortimer, Journal of Polymer Science: Part A-1; *Chain transfer in ethylene polymerization*; Vol. 4, p 881-900 (1966); G. Mortimer, Journal of Polymer Science: Part A-1, *Chain transfer in ethylene polymerization. Part IV. Additional study at 1360 atm and 130° C.*; Vol. 8, p 1513-1523 (1970); G. Mortimer, Journal of Polymer Science: Part A-1, *Chain transfer in ethylene polymerization. Part V. The effect of temperature*; Vol. 8, p 1535-1542 (1970); G. Mortimer, Journal of Polymer Science: Part A-1, *Chain transfer in ethylene polymerization Part V. The effect of pressure*, Vol. 8, p 1543-1548 (1970); and G. Mortimer, Journal of Polymer Science: Part A-1, *Chain transfer in ethylene polymerization VII. Very reactive and depleteable transfer agents*, Vol. 10, p 163-168 (1972). Table 4 lists the kinetic parameters for free radical CO copolymerization with ethylene (see Buback reference below). Activation energy has been derived from $r_{10}$ data measured at 150 and 220° C. (Buback et al.; Physica 139 &140B, 626-628 (1986).

TABLE 4

Kinetic parameters for ethylene-CO high pressure free radical copolymerization

| Reactivity ratio $r_{1,0}$ | Activation energy $E_a$ cal/mole | Activation volume $E_v$ cc/mole | Reactivity ratio $r_{2,0}$ |
|---|---|---|---|
| 2.06 | 3322 | 0 | 0 |

Where $r_{1,0}$ is the pre-exponential factor. The reactivity ratio is calculated by: $r_1 = r_{1,0} * \exp(-E_a/RT)$. Due to the alternating copolymerization mechanism, two consecutive incorporations of CO are not possible ($k_{22} = 0$), therefore $r_2 = k_{22}/k_{21} = 0$.

Use of CO as Comonomer:
Reaction Characteristics in Regard to Reactor Stability and Maximum Temperature Capability:

Colombo et al. (Journal of Polymer Science, A1, 6, 3201-3215(1968)) show the following: a) the individual reaction rate of CO is much faster than the individual reaction rate of ethylene; however the incorporation of a CO unit has to be followed by the incorporation of an ethylene unit; b) formation of an alternating CO and ethylene copolymer is preferred; and c) ethylene-carbon monoxide copolymer contains maximal 50 mole % CO. These characteristics led to the following impact on overall propagation rate: a) the rate is strongly influenced by the CO concentration in the reactor; b) the rate is maximal for 100% ethylene, zero for 100% CO; and c) the rate has a sub optimum at CO concentrations between 30 to 50 wt % in the reaction mixture.

Colombo et al. show that the overall propagation rate dropped, from a maximum at 100% ethylene, by a factor of 10 or more for CO concentrations of 4 wt % or lower. This behavior can lead to potential unstable operation in "multi reaction zone" reactor systems. Especially, the stability in a tubular-based reactor system could be affected, since the overall propagation rate could accelerate, in a tubular reaction zone, by the consumption and depletion of CO comonomer along the reaction zone. The occurrence of an accelerating "overall propagation rate" is confirmed by Buback et al. (Physica 139 &140B, 626-628 (1986)).

The ethylene-carbon monoxide copolymers of this invention are made with carbon monoxide concentrations in the overall ethylene feed, ranging from 0.2 to 4 wt % CO. The distribution of carbon monoxide over the ethylene feeds needs careful consideration, in regard to process safety, and in regard to the desired distribution of incorporated carbon monoxide monomer inter and intra polymer molecules. High concentrations at the inlet of a tubular reaction zone should be avoided.

Furthermore, application of autoclave reaction zone(s) in a tubular-based reactor system will improve reaction stability. The polymerization is performed at the lower CO outlet concentration in a CSTR (continuous stirred tank reactor) reaction zone, while in a tubular reaction zone, the CO concentration ranges from higher, at the inlet, to lower, at the outlet, versus a CSTR reactor zone.

Lowering maximum polymerization temperature will help to improve, and counteract negative effects on, polymerization stability. Based on above reaction and process stability characteristics, the maximum peak temperatures in reaction zones, receiving a fresh carbon monoxide feed, are limited to 290° C. The maximum operating temperature is further reduced for higher CO concentrations.

Feeding and Distribution of Carbon Monoxide in a High Pressure Polymerization Process:

Carbon monoxide is a gaseous component supplied by pressurized pipeline and/or pressurized cylinder. Due to its gaseous state, the pressurized carbon monoxide is fed to a high pressure, free radical process at one of the various compression stages of a booster or primary compressor, and compressed and fed to inlet side of the secondary compressor, through the remaining compression stages of the primary and/or booster compressor. Without taking special precautions in the design and line-up of the booster, primary, secondary compressor systems, CO will be evenly distributed over the ethylene feed streams to the reactor; however by taking special precautions in the design and line-up of the booster, primary and secondary compressor and high pressure recycle system, differentiated CO concentrations can be achieved in the various ethylene feed streams to the reactor.

Impact of the Use CO on Heat Transfer in Tubular Reactor Zones:

Impact of heat transfer: The use of CO comonomer in a tubular, free radical polymerization leads to strongly reduced heat transfer as shown in FIG. 1. This figure compares, for the same reactor, a temperature profile for a LDPE homopolymer versus an ethylene-carbonmonoxide (99%-1%) copolymer with similar melt-indices, namely 0.75 versus 0.55 g/10 min. The carbon monoxide is fed together with the ethylene to Rx-zones 1 and 2. No heat transfer analysis can be made for Rx-zone 1, due to the short length and rising temperature profile, while the $2^{nd}$ Rx-zone shows strongly reduced heat transfer after the temperature maximum, while the $3^{rd}$ and $4^{th}$ Rx-zones, receiving no additional CO feed, show normal heat transfer. The reduced heat transfer is thought to be affected by the formation of a fouling layer at the inside tube wall, and is found to be affected by the applied CO concentration. FIG. 1 shows the temperature profiles for a process producing an ethylene (99%)-carbon monoxide (1%) copolymer with a 50/50/0/0 ethylene distribution, in which CO is evenly distributed over the ethylene feeds. For LDPE homopolymer, an inside fouling factor of $30 \times 10^{-6}$ mm can be generally taken to achieve a matching simulated temperature profile.

The heat resistance at the inside process side through fouling can be expressed as an apparent thickness of an inside fouling layer. The fouling layer thickness can be linearly translated to heat resistance with the following factor: 30*10E-6 [m] fouling layer=a heat resistance of 0.00023 [m^2 h ° C./Kcal].

For a 1% CO copolymer product, the inside fouling factor in the $2^{nd}$ Rx-zone has to be tripled, to match the observed temperature profile, while the inside fouling in the $3^{rd}$ and $4^{th}$ reaction zones are hardly affected by the ethylene-carbon monoxide production. The following simplified model was developed, and applied, to simulate the impact of the presence and level of added CO to a reaction zone, on the fouling factor of a reaction zone: Fouling factor=$20 \times 10^{-6}+20 \times 10^{-6}$*[CO (ppm)]/500 (ppm)]. Note: All Rx-zone receiving no CO have a fouling factor of $30 \times 10^{-6}$ m. Table 5 demonstrates how the fouling factor depends on the level and presence of CO comonomer for a tubular process with a 50/50/0/0 ethylene distribution, with even distribution of CO over both ethylene feed streams.

TABLE 5

| Concentration in mole ppm of CO fed at inlet of reaction zone in cumulative ethylene stream | | | | |
|---|---|---|---|---|
| 1st Rx-zone | 0 | 3,000 | 4,500 | 9,000 |
| 2nd Rx-zone | 0 | 1,500 | 2,250 | 4,500 |
| 3rd Rx-zone | 0 | 0 | 0 | 0 |
| 4th Rx-zone | 0 | 0 | 0 | 0 |
| Fouling factor in $10^{-6}$ m | | | | |
| 1st Rx-zone | 30 | 150 | 210 | 390 |
| 2nd Rx-zone | 30 | 90 | 120 | 210 |
| 3rd Rx-zone | 30 | 30 | 30 | 30 |
| 4th Rx-zone | 30 | 30 | 30 | 30 |

Description of Flow Diagram

Figure 2:
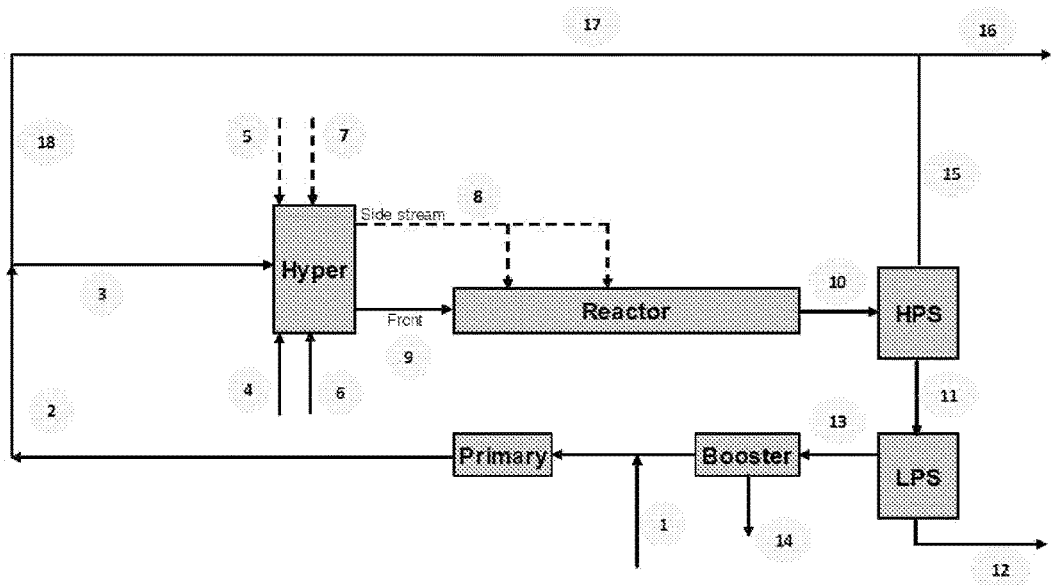
FIG. 2 depicts a process configuration leading to even concentrations of CO in the ethylene feed streams.

FIG. 2 shows a generalized flow scheme of a simulated high pressure polymerization configuration containing a tubular reactor. Stream (1) is the fresh ethylene make-up, which is compressed together with the outlet of the Booster by the Primary to stream (2). Furthermore carbon monoxide (CO) can be added through line (1). Stream (2) is combined with high pressure recycle stream (18) and distributed over the suction inlets of the Hyper. The Hyper pressurizes the ethylene feed streams to a level sufficient to feed the high pressure tubular reactor (Reactor). Although not depicted, the flow scheme could include partial combination and/or distribution of the stream (2) and stream (18) over the inlets of the Hyper.

Stream (4) and/or (5) depicts the CTA system make-up feed. The CTA make-up can, in principle, be freely distributed over the main compression streams fed and/or distributed over the side stream (8) and front stream (9). CTA make-up streams (4) and/or (5) can be fed in the inlet(s), interstage(s), outlet(s) of the Hyper and/or inlet(s) of the reaction zones. The CTA system can consist of single and/or multiple components and include varying compositions.

Without taking special precautions in the design and line-up of the booster, primary, secondary compressor systems, CO will be distributed at even concentrations over the ethylene feed streams to the reactor; however by taking special precautions in the design and the line-up of the booster, primary and secondary compressor and high pressure recycle systems, differentiated CO concentrations can be achieved in the various ethylene feed streams to the reactor. Stream (6) and/or stream (7) depict the optional rheology modifying agent feed. The rheology modifying agent or carbonyl containing comonomer, like alkyl acrylates, vinyl acetate, etc, feed(s) can, in principle, be freely distributed over the main compression streams fed to, and/or distributed over, the side stream (8) and/or front stream (9). Rheology modifying agent streams (6) and/or (7) can be fed in the inlet(s), interstage(s), outlet(s) of the Hyper, individual ethylene feed streams to the reactor, and/or directly into the reaction zones. The discharge temperature of the Hyper is typically in the range of 60 to 100° C. The ethylene feed to the first reaction zone is typically preheated to a temperature from 130 to 180° C., while the ethylene of the side feed is fed to the reactor at the Hyper discharge temperature or cooled prior to feeding to the reactor.

The polymerization conditions are given in Table 6. In the reactor, the polymerization is initiated with the help of free radical initiation systems injected and/or activated at the inlet of each reaction zone. The maximum temperature in each reaction zone is controlled at a set point by regulating the concentration and/or feed amount of initiation system at the start of each reaction zone. After finishing the reaction, and having applied cooling steps, the reaction mixture is depressurized and/or cooled in (10), and separated in the high pressure separator (HPS). The HPS separates the reaction mixture into an ethylene rich stream (15), containing minor amounts of waxes and/or entrained polymer, and a polymer rich stream (11) which is sent for further separation to the LPS. Ethylene stream (15) is cooled and cleaned in stream (17). Stream (16) is a purge stream to remove impurities and/or inerts.

The polymer separated in the LPS is further processed in (12). The ethylene removed in the LPS (13) is fed to the Booster, where, during the compression, condensables, such as solvent, lubrication oil and others, are collected and removed through stream (14). The outlet of the Booster is combined with make-up ethylene stream (1), and further compressed by the Primary.

Figure 3:
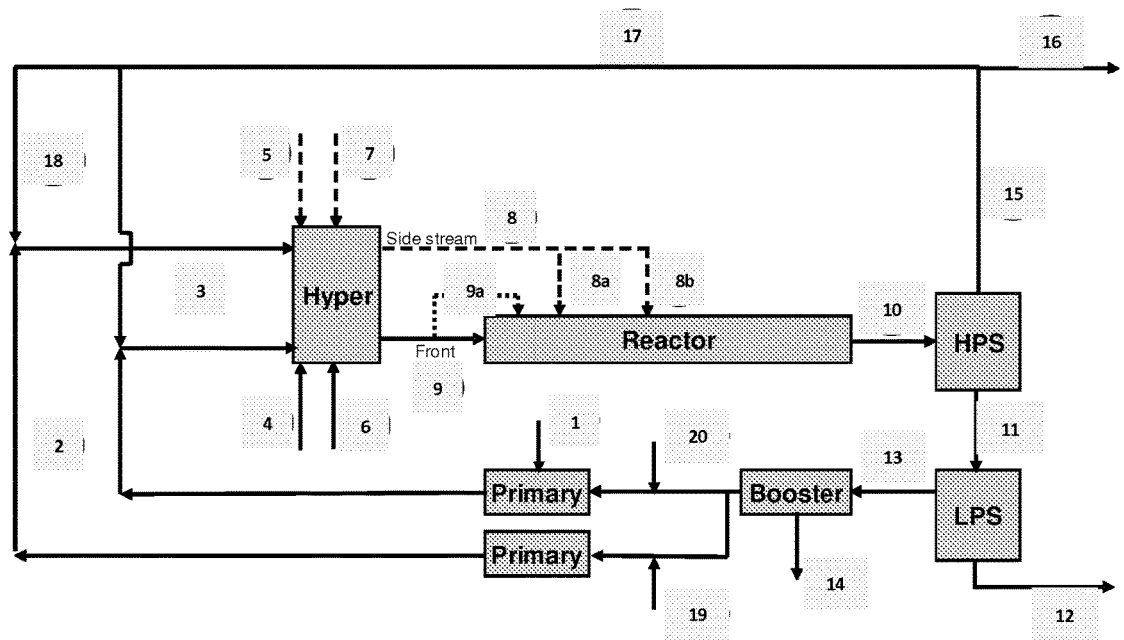
FIG. 3 depicts a process configuration allowing flexible and uneven concentrations of CO in the ethylene feed streams.

FIG. 3 shows a flow scheme of a simulated high pressure polymerization configuration containing a tubular reactor. Stream (1) is the fresh ethylene make-up, which is compressed together with the outlet of the Booster by the Primary's to streams (2). One Stream (2) coming from one Primary is combined with the high pressure recycle stream (18) and send to a suction inlet of the Hyper, where it is pressurized and discharged into line (8). The ethylene in line (8) is further distributed over the reactor side streams (8a) and (8b). The other line (2) coming from one Primary is combined with ethylene coming from line 17 and sent to a suction inlet of the Hyper, where it is pressurized and discharged into line (9). The ethylene of line (9) is sent to the front of the reactor, but can also partially distributed to line (9a), which goes to the side of the reactor. The Hyper pressurizes the ethylene feed streams to a level sufficient to feed the high pressure tubular reactor (Reactor). Although not depicted, the flow scheme could include partial combination and/or distribution of the stream (2) and stream (18) over the inlets of the Hyper.

Stream (4) and/or (5) depicts the CTA system make-up feed. The CTA make-up can, in principle, be freely distributed over the main compression streams fed and/or distributed over the side stream (8) and front stream (9). CTA make-up streams (4) and/or (5) can be fed in the inlet(s), interstage(s), outlet(s) of the Hyper and/or inlet(s) of the reaction zones. The CTA system can consist of single and/or multiple components and include varying compositions.

Line 19 and 20 are CO feed lines to distribute the CO over the ethylene feed lines to the reactor. Stream (6) and/or stream (7) depict the optional rheology modifying agent feed. The rheology modifying agent or carbonyl containing comonomer, like alkyl acrylates, vinyl acetate, etc, feed(s) can, in principle, be freely distributed over the main compression streams fed to, and/or distributed over, the side stream (8) and/or front stream (9). Rheology modifying agent streams (6) and/or (7) can be fed in the inlet(s), interstage(s), outlet(s) of the Hyper, individual ethylene feed streams to the reactor, and/or directly into the reaction zones. The discharge temperature of the Hyper is typically in the range of 60 to 100° C. The ethylene feed to the first reaction zone is typically preheated to a temperature from 130 to 180° C., while the ethylene of the side feed is fed to the reactor at the Hyper discharge temperature or cooled prior to feeding to the reactor.

The polymerization conditions are given in Table 6. In the reactor, the polymerization is initiated with the help of free radical initiation systems injected and/or activated at the inlet of each reaction zone. The maximum temperature in each reaction zone is controlled at a set point by regulating the concentration and/or feed amount of initiation system at the start of each reaction zone. After finishing the reaction, and having applied cooling steps, the reaction mixture is depressurized and/or cooled in (10), and separated in the high pressure separator (HPS). The HPS separates the reaction mixture into an ethylene rich stream (15), containing minor amounts of waxes and/or entrained polymer, and a polymer rich stream (11) which is sent for further separation to the LPS. Ethylene stream (15) is cooled and cleaned in stream (17). Stream (16) is a purge stream to remove impurities and/or inerts. The polymer separated in the LPS is further processed in (12). The ethylene removed in the LPS (13) is fed to the Booster, where, during the compression, condensables, such as solvent, lubrication oil and others, are collected and removed through stream (14). The outlet of the Booster is combined with make-up ethylene stream (1), and further compressed by the Primary.

FIGS. 2 and 3 show respectively exemplary process flow diagrams to achieve the following: a) even concentrations of CO in the ethylene feed streams, and b) flexible and uneven concentrations of CO in the ethylene feed streams. In FIG. 2, CO can be added through line (1) or at the Booster. In FIG. 3 CO can be added through line (1), line (20), line (19) and/or at the booster depending on the required distribution of CO in the process or in the final product.

Reactor and Feed Configurations Used in Comparative and Inventive Polymerizations Table 6 shows the reactor configuration (i.e., dimensions, lay-out, applied ethylene feed distribution) used for the simulated comparative and inventive polymerizations. The notation "100/0/0/0" means that all the total ethylene feed is fed to the first reaction zone, while no fresh feed streams are fed to the second, third and fourth reaction zones. The ethylene received in the second, third and fourth reaction zones are carry-over from the previous reaction zones. Likewise, the notations "50/50/0/0" mean that 50% of the total ethylene feed is fed to the first reaction zone (or second reaction zone) and 50% of the total ethylene feed is fed to the second reaction zone (or outlet of first reaction zone), while no fresh feed streams are fed to the third and fourth reaction zones. The ethylene received in the third and fourth reaction zones is carry-over from previous reaction zones.

The notation "25/25/50/0/" means that 25% of the total ethylene feed is fed to the first reaction zone, 25% of the total ethylene feed is fed to second reaction zone and 50% of the total ethylene feed is fed to the third reaction zone, while no fresh feed streams are fed to the fourth reaction zone. The ethylene received in the fourth reaction zone is carry-over from previous reaction zones. Further columns in Table 6 give information on pressure level and start temperature at the inlet of the first reaction zone, the ethylene feed temperature when a side ethylene feed stream is applied, and the maximum or peak temperatures in each reaction zone (Rx).

cooling/heating is applied through jackets around the high pressure tubes by co-current or counter-current flow. Single or multiple cooling and/or heating zones can be applied in

TABLE 6

Reactor Configurations, Feed Modes, Process Conditions Used in Comparative and Inventive Polymerizations

| Ex. | Tstart/Tside ° C. | Peak Polymerization temp ° C. | Pressure bar | CO injection Rx-zone | Fouling factor $10^{-6}$ m |
|---|---|---|---|---|---|
| Comparative Polymerization (CP) 1 and Inventive Polymerizations (IP) 1-2: Ethylene feed distribution 100/0/0/0; Inside tube diameter (60 mm) and Rx-zone length (distribution): 1600 m (400-400-400-400 m) | | | | | |
| CP1 | 150/— | 290/290/290/290 | 2,500 | none | 30/30/30/30 |
| IP1 | 150/— | 290/290/290/290 | 2,100 | $1^{st}$ Rx-zone | 210/30/30/30 |
| IP2 | 150/— | 290/315/305/290 | 2,100 | $1^{st}$ Rx-zone | 416/30/30/30 |
| Comparative Polymerization (CP) 2 and Inventive Polymerizations (IP) 3-6: Ethylene feed distribution: 50/50/0/0; Inside tube diameter 40-60-60-60 mm and Rx-zone length (distribution): 1600 m (300-500-400-400 m) | | | | | |
| CP2 | 150/50 | 290/290/290/290 | 2,500 | none | 30/30/30/30 |
| IP3 | 150/50 | 290/290/305/290 | 2,100 | $1^{st}$ & $2^{nd}$ | 218/119/30/30 |
| IP4 | 150/50 | 290/290/290/290 | 2,100 | $1^{st}$ & $2^{nd}$ | 408/214/30/30 |
| IP5 | 150/50 | 320/290/290/290 | 2,100 | $2^{nd}$ | 30/228/30/30 |
| IP6 | 150/50 | 320/290/290/290 | 2,100 | $2^{nd}$ | 30/420/30/30 |
| Comparative Polymerization (CP) 3 and Inventive Polymerization (IP) 7 to 11: Ethylene distribution 25/25/50/0; Inside tube diameter 30-40-60-60 mm and Rx-zone length (distribution): 1600 m (200-300-600-500 m) | | | | | |
| CP3 | 150/50 | 290/290/290/290 | 2,500 | none | 30/30/30/30 |
| IP7 | 150/50 | 290/290/290/290 | 2,100 | $1^{st}$, $2^{nd}$ & $3^{rd}$ | 206/113/113/30 |
| IP8 | 150/50 | 290/290/290/290 | 2,100 | $1^{st}$, $2^{nd}$ & $3^{rd}$ | 380/200/200/30 |
| IP9 | 150/50 | 320/320/290/290 | 2,100 | $3^{rd}$ | 30/30/222/30 |
| IP10 | 150/50 | 325/325/290/290 | 2,100 | $3^{rd}$ | 30/30/430/90 |
| IP11 | 150/50 | 280/290/305/290 | 2,100 | $1^{st}$ & $2^{nd}$ | 780/400/30/30 |

Figure 4:
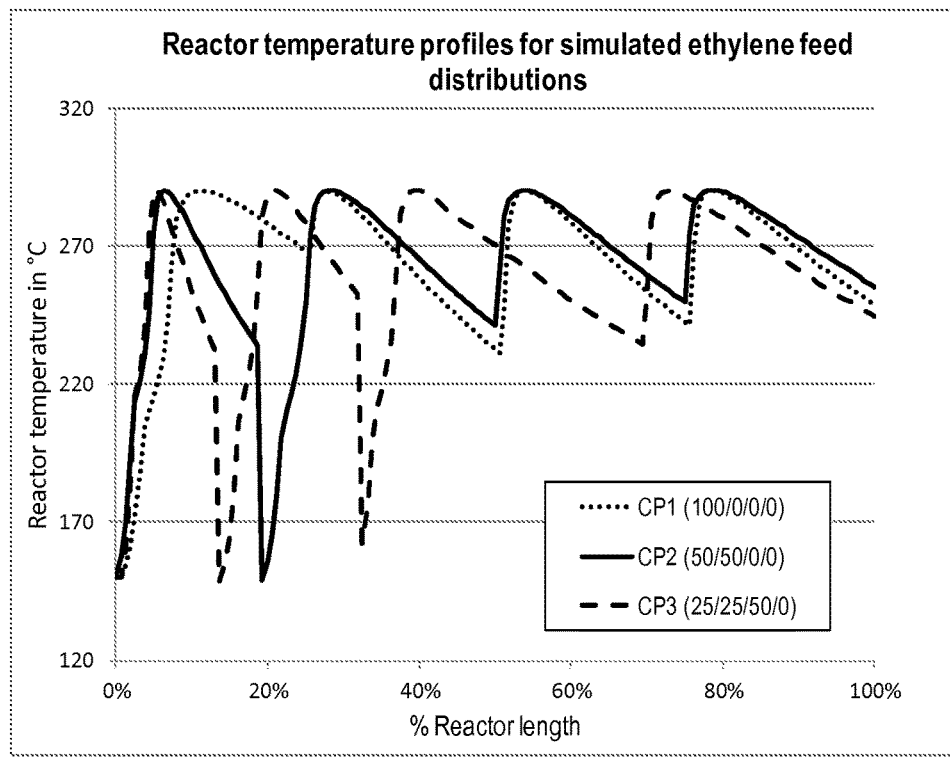
FIG. 4 shows the reactor temperature profiles for comparative polymerizations CP1, CP2 and CP3.

The reactor temperature profiles for the comparative polymerizations of the reactor configurations are given in FIG. 4. In these diagrams, all reaction zones have one cooling section; however, multiple cooling sections, with counter- or co-current heat transfer media, operating at differentiated inlet temperatures may be used.

Different cooling and/or heating media can be applied for the reactor cooling and/or preheating sections. The cooling/heating media comprise water, pressurized water (temperature level can be varied), condensate, boiling condensate, etc. The temperature of the cooling media is typically in the range from 0 to 220° C., while the temperature for preheating services is typically in the range from 100 to 250° C. The cooling/preheating was applied by counter-current, and with one cooling section per reaction zone.

Table 7 shows the chain transfer agent and concentration level and the feed distributions used for the carbon monoxide addition. The ethylene feed distributions show the percent of total ethylene feed stream fed to each reaction zone, while the carbon monoxide distributions shows the concentration of added component in wt ppm versus the cumulative ethylene feed.

TABLE 7

CO distribution and predicted conversions levels and functionality of overall polymer

| Example | CTA (PA) ppm | CO feed conc in reaction zone inlet ppm | Conversion Overall % | CO % | Overall Polymer CTA (PA)/ 1000 C. | CO/ 1000 C. | SCB/ 1000 C. | LCB/ 1000 C. |
|---|---|---|---|---|---|---|---|---|
| CP1 | 3040 | 0 | 32.8 | 0.0 | 0.39 | 0.0 | 24.4 | 3.6 |
| IP1 | 2790 | 4,750/0/0/0 | 31.2 | 97.9 | 0.39 | 7.5 | 25.5 | 4.0 |
| IP2 | 2590 | 9,900/0/0/0 | 32.3 | 97.6 | 0.36 | 15.1 | 25.7 | 4.4 |
| CP2 | 3125 | 0 | 33.3 | 0.0 | 0.41 | 0.0 | 24.0 | 3.7 |
| IP3 | 2675 | 4,960/2,480/0/0 | 32.5 | 97.6 | 0.41 | 7.5 | 25.0 | 4.5 |
| IP4 | 2710 | 700/4,850/0/0 | 31.6 | 94.3 | 0.41 | 15.0 | 25.1 | 4.3 |
| IP5 | 2560 | 0/5,200/0/0 | 33.6 | 96.2 | 0.39 | 7.5 | 26.2 | 4.8 |
| IP6 | 2560 | 0/10,500/0/0 | 33.6 | 90.2 | 0.38 | 15.1 | 25.4 | 4.7 |
| CP3 | 3195 | 0 | 31.9 | 0.0 | 0.42 | 0.0 | 23.6 | 3.6 |
| IP7 | 1980 | 4,620/2,320/2,320/0 | 30.9 | 96.5 | 0.32 | 7.5 | 22.9 | 4.1 |
| IP8 | 1940 | 9,000/4,500/4,500/0 | 31.5 | 93.7 | 0.31 | 15.0 | 22.8 | 3.8 |
| IP9 | 1760 | 0/0/5,050/0 | 31.2 | 92.3 | 0.29 | 7.5 | 22.1 | 4.7 |
| IP10 | 1700 | 0/0/10,250/0 | 31.1 | 89.4 | 0.25 | 15.1 | 25.0 | 4.6 |
| IP11 | 1900 | 19,000/9,500/0/0 | 31.3 | 99.3 | 0.27 | 15.0 | 24.7 | 4.3 |

* Ethyl/butyl branches by backbiting; polymers prepared in the absence of propylene or other olefinic CTAs.

Discussion of Results:

Table 7 and 8 show the simulated levels of functionality arising from CTA, CO as amonomer and long chain and short chain branching, in the whole polymer, versus the lowest molecular weight fraction formed in the last reaction zone.

Table 6 to 8 demonstrate that the application of special process conditions, like pressure, temperature and feed distributions, together with CO as comonomer, results in polymers with unique combinations of MWD and associated rheology and polar functionality, making these polymers, for instance, suitable for coating applications at lower temperatures and/or increased adhesion.

Furthermore Table 7 demonstrates clearly that the carbonyl content in the polymer, originating from the use of ketonic and/or aldehydic CTA's, is overwhelmed by the level of carbonyl originating from the use of CO as a comonomer, and that the distribution of CO in the process can be used to influence the carbonyl content inter and intra polyethylene molecules. Feeding CO mainly to the front of the reactor will lead to larger polymer molecules, which internally have large starting backbones rich (high) in CO, while the more outer long chain branches formed in the last reaction zones are poor (low) in CO or carbonyl content. Feeding no or minor quantities of CO to the front reaction zones will lead to larger polymer molecules with outer longer chain branches rich in CO or carbonyl content. Table 8 shows the functionality levels in the lowest molecular weight formed in the last reaction zone, and the G' rheology parameter predicted for the whole polymer.

TABLE 8

Levels of functionality in overall polymer and the lowest molecular weight formed in the last reaction zone.

| Example | Polymer G' Pa | Lowest molecular weight in last Rx-zone | | | |
|---|---|---|---|---|---|
| | | SCB*/ 1000 C. | LCB/ 1000 C. | CTA (PA)/ 1000 C. | CO/ 1000 C. |
| CP1 | 103.9 | 32.4 | 9.4 | 0.46 | 0.00 |
| IP1 | 110.7 | 34.7 | 10.6 | 0.45 | 0.49 |
| IP2 | 116.7 | 34.6 | 11.1 | 0.43 | 1.20 |
| CP2 | 105.7 | 33.0 | 9.9 | 0.49 | 0.00 |
| IP3 | 118.3 | 35.5 | 11.7 | 0.45 | 0.58 |
| IP4 | 115.0 | 35.0 | 11.1 | 0.45 | 1.55 |
| IP5 | 122.3 | 36.0 | 12.3 | 0.43 | 1.02 |
| IP6 | 120.5 | 35.7 | 12.1 | 0.43 | 2.61 |
| CP3 | 104.6 | 32.6 | 9.2 | 0.49 | 0.00 |
| IP7 | 111.5 | 34.7 | 10.4 | 0.32 | 0.93 |
| IP8 | 107.6 | 34.1 | 9.7 | 0.31 | 1.73 |
| IP9 | 121.5 | 35.3 | 11.2 | 0.29 | 4.11 |
| IP10 | 119.8 | 34.9 | 10.9 | 0.28 | 5.76 |
| IP11 | 114.7 | 34.9 | 10.9 | 0.31 | 0.36 |

*Ethyl/butyl branches by backbiting; polymers prepared in the absence of propylene or other olefinic CTAs.

The G' was predicted with the help of a correlation derived from measured MI and G' data and simulated LCBf numbers of samples from WO2013/078018, see Table 9.

TABLE 9

Model G' as a function of MI and LCBf.

| Patent-sample WO2013/078018 | MI (dg min$^{-1}$) | G' (Pa) | simulated LCBf/1000 C. |
|---|---|---|---|
| A | 7.3 | 81 | 3.92 |
| B | 7.5 | 89 | 4.32 |
| C | 6.6 | 98 | 4.55 |
| 1 | 3.5 | 126 | 4.62 |
| 5 | 2.0 | 153 | 4.64 |

The following equation was derived: G'=111.6−105*log (MI)+15.5*LCBf. G'≥127.5−1.25*MI. MI=4, leads to G'≥122.5 (high level). In all cases the G' is at a G" of 500 Pa at 170° C.

Comparative Polymerization 1 and Inventive Polymerizations 1 and 2:

Comparative Polymerization 1 CP and Inventive Polymerizations 1 and 2 show the simulation results for a process with 100/0/0/0 ethylene distributions along the reaction zones. Introduction of CO in the 1$^{st}$ Rx-zone leads to poorer heat transfer in the 1$^{st}$ Rx-zone. This process configuration leads to a strongly varying incorporation level of CO, as shown by the incorporation values for whole polymer versus lowest molecular weight formed in last reaction zone. A further factor to consider is that, at the beginning of the reactor, long chain segments are formed, due to the average high molecular weight (Mn or d-Xn) and the low level of long chain branching. In the 3$^{rd}$ and 4$^{th}$ reaction zones, smaller chain segments are formed and distributed partly over new molecules, and mainly as LCB's over existing molecules; however these chain segments have low levels of CO. As a consequence, the large molecules will contain, inside their structure, large chain segments, which are rich in CO, while the chain segment in the outer sphere layers of the large molecules are poor in CO. The same (CO poor) counts for a low molecular weight fraction as hexane extractables.

Figure 5:
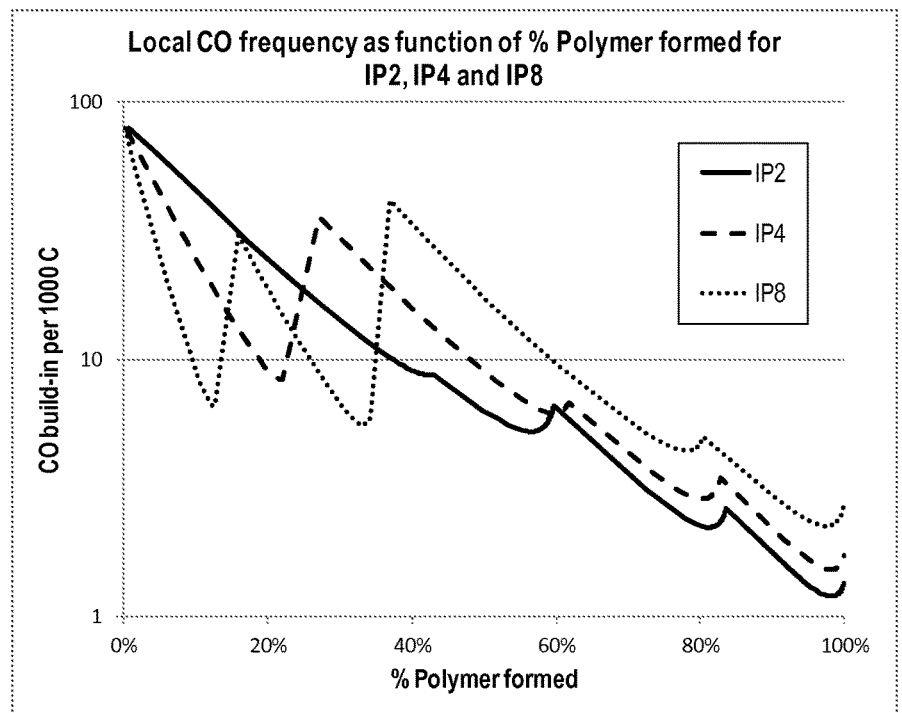
FIG. 5 shows the local CO frequency as a function of % polymer formed in inventive polymerizations IP2, IP4 and IP8.
Figure 6:
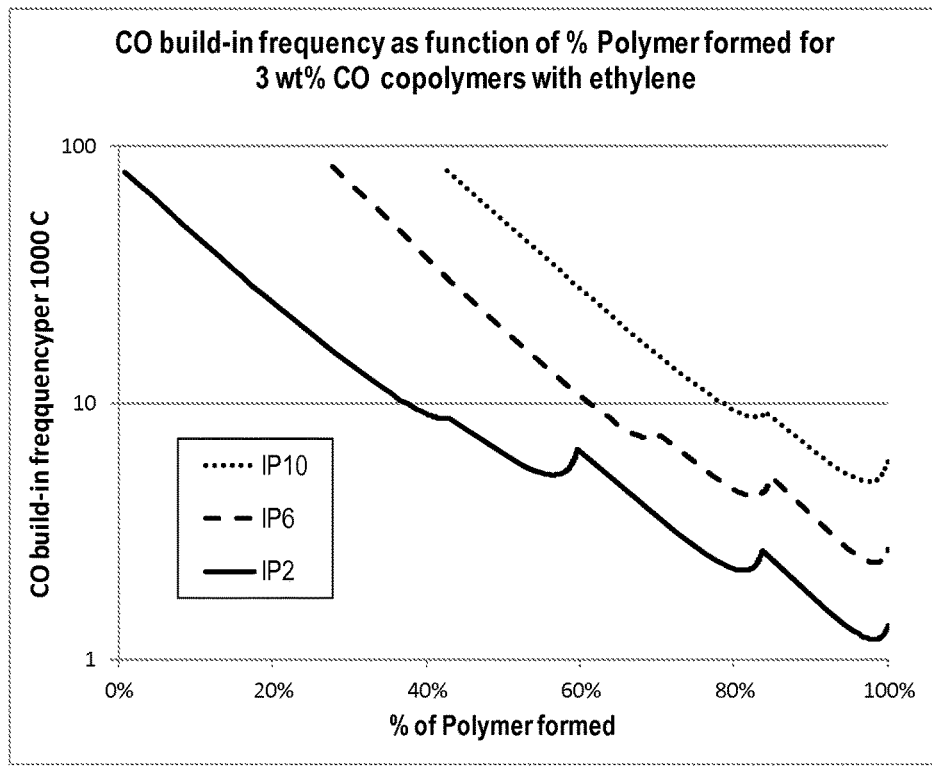
FIG. 6 shows local CO frequency as a function of % polymer formed in inventive polymerizations IP2, IP6 and IP10.
Figure 7:
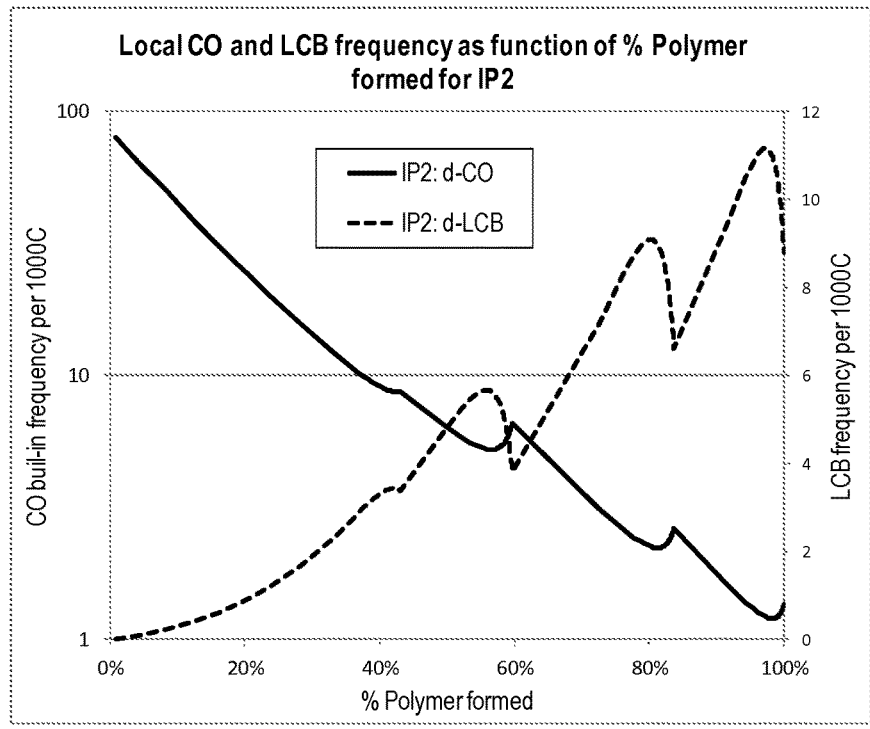
FIG. 7 shows local CO and LCB frequency for inventive polymerization IP2.
Figure 8:
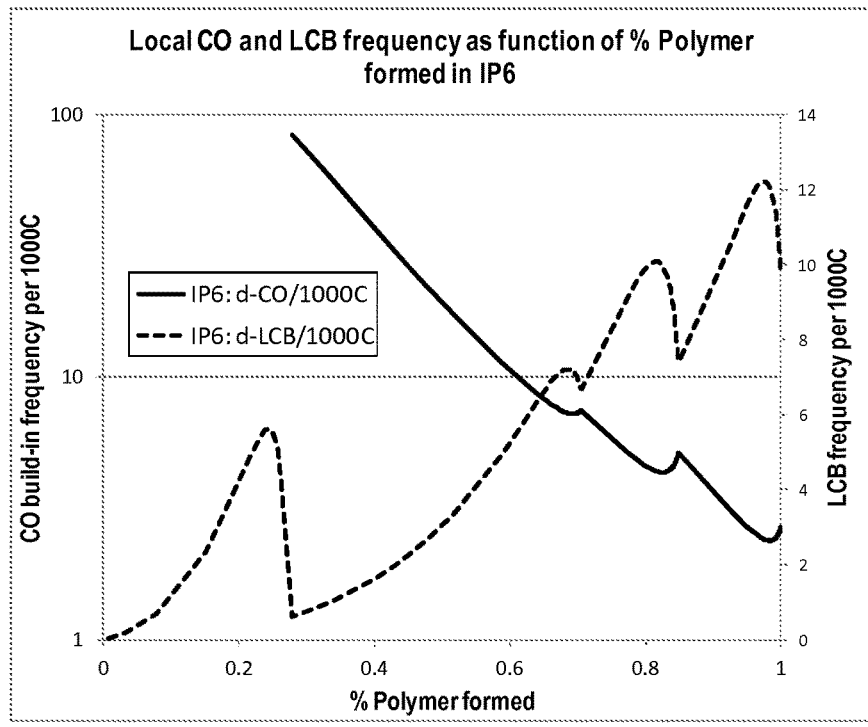
FIG. 8 shows local CO and LCB frequency for inventive polymerization IP6.
Figure 9:
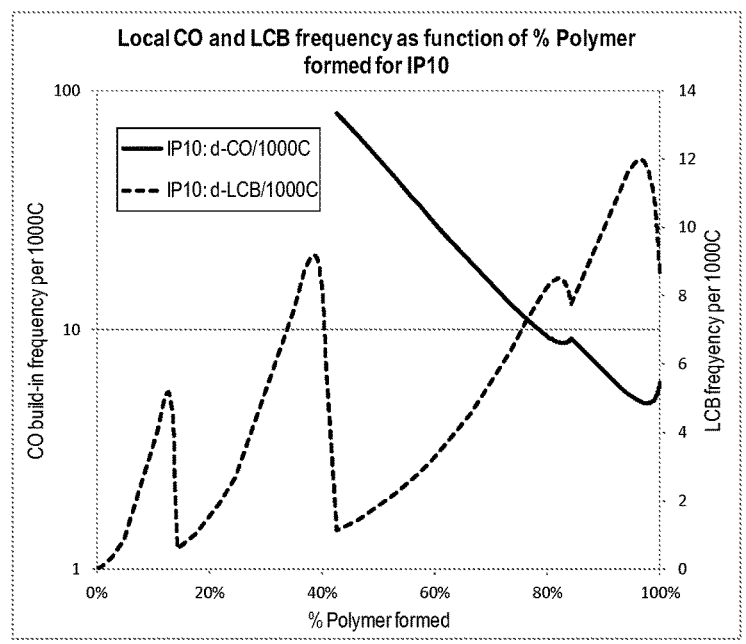
FIG. 9 shows local CO and LCB frequency for inventive polymerization IP10.
Figure 10:
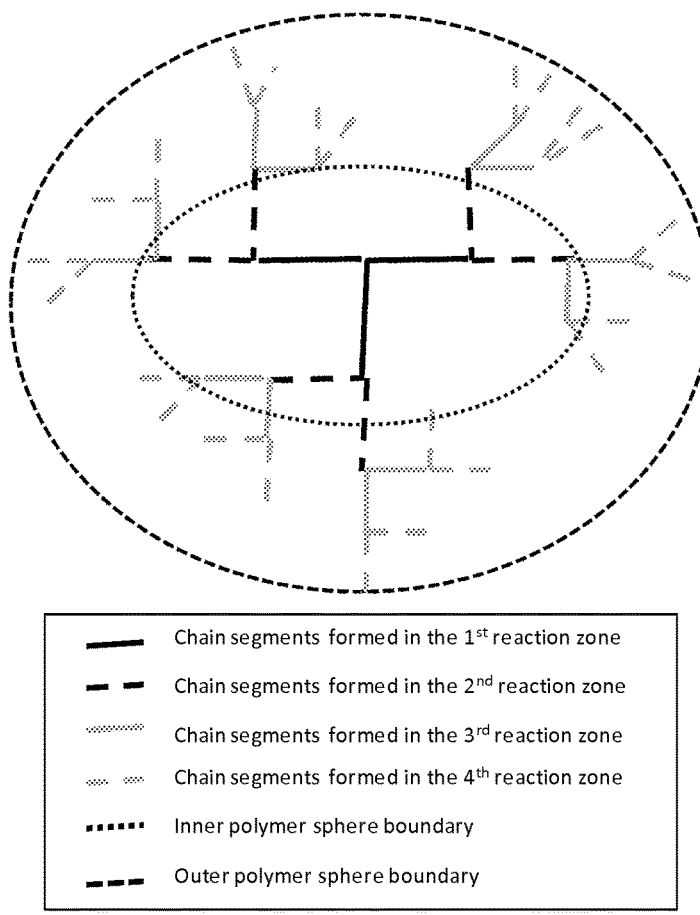
FIG. 10 depicts a Caley structure representing the simplified polymerization structure originating from a four reaction zone operation.

Comparative Polymerization 2 and Inventive Polymerizations 3 to 6:

Comparative Polymerization 2 and Inventive Polymerizations 3 to 6 show the simulations for a process with a 50/50/0/0 ethylene feed distribution along the reaction zones. The CO feed is either distributed evenly over both ethylene feed streams, as in IP3 and IP4, or is fed to the reactor with the second ethylene stream, as in IP5 and IP6. These ethylene and CO feed stream distributions lead to a better distribution of the CO, as demonstrated by the CO content in the lowest molecular weight formed in the last reaction zone. See also FIGS. 5 and 6.

Feeding all CO through the second ethylene feed results, surprisingly, in an even better distribution. The CO peak level is the same, but the higher level of LCB in the 2$^{nd}$ and following reaction zones, results in "chain segments with CO" that are smaller and better distributed inter-molecules, and more positioned at the outer sphere layers of large polymer molecules. Broad MWD and good rheological properties can be derived by operating a lower reactor pressure and increasing the maximum temperature in the reaction zones not receiving fresh CO feed. The temperature in the 4$^{th}$ reaction zone is kept low to control/reduce n-hexane extractables. This operating strategy leads to products with rheology suited for extrusion coating application and showing improved adhesion by better distributed, higher carbonyl contents and low hexane extractable levels.

Comparative Polymerization 3 and Inventive Polymerizations 7 to 11:

Comparative Polymerization 3 and Inventive Polymerizations 7 to 11 show the simulation results for a process with a 25/25/50/0 ethylene feed distribution along the reaction zones. The CO feed is either distributed evenly over the ethylene feed streams, as in IP7 and IP8, or is fed to the reactor with the third ethylene stream, as in IP9 and IP10. These ethylene and CO feed stream distributions lead to a better distribution of the CO, as demonstrated by the CO content in the lowest molecular weight formed in the last reaction zone. See also FIGS. 5-9.

Feeding all CO through the third ethylene feed results, surprisingly, in an even better distribution. The CO peak level is the same, but by the higher level of LCB in the $3^{rd}$ and $4^{th}$ reaction zones, the chain segments containing high levels of CO are smaller and very well distributed interpolymer molecules and positioned at the outer sphere layers of large polymer molecules. The above operating strategies lead to products with rheology suited for extrusion coating applications and show excellent adhesion by better distributed higher carbonyl content and low hexane extractable levels.

Feeding all CO to the front reaction zone leads to a very poor CO distribution inter polymer molecules and intra large polymer molecules. The CO is built-in inside the larger polymer molecules and is shielded by LCB's with low CO content. The CO will be mainly incorporated in the larger polymer molecules and their backbones. This distribution might be preferred in photo-degradation applications.

In Summary

Surprisingly, it has been found that by distributing the CO feeds, through distributing the ethylene feeds, and/or by concentrating the CO feed in the downstream reactor ethylene feeds, the distribution of CO over polymer molecules can be improved. Furthermore, the distribution of CO over larger polymer molecules is improved, by incorporation of more CO in the outer sphere layer of larger molecules. The preferred intra-molecular distribution of CO in larger polymer molecules leads to enhanced contact between carbonyl groups in the larger molecules with the substrate in a coating application. Furthermore, these preferred distributions of CO provide enhanced rheological properties like G', at lower operating pressures and higher temperatures in reaction zones not exposed to fresh CO feeds. Conventional ethylene-carbon monoxide chemistry can promote/lead to the occurrence of severe process instabilities, for example, ethylene decompositions; however the invented operating strategy will mitigate such potential process instabilities. Furthermore the hexane extractable is controlled, and reduced, by operating the last reaction zone at a reduced temperature.

The invention claimed is:

1. A high pressure, free-radical polymerization process for polymerizing an ethylene-based polymer, said process comprising polymerizing ethylene, in a reactor configuration comprising a reactor with at least two reaction zones, a first reaction zone and a reaction zone located downstream from the first reaction zone; and wherein
   Carbon Monoxide (CO) is added to the reactor in at least one reaction zone located downstream from the first reaction zone, and
   wherein, less than 40 weight percent of the total CO is fed to the first reaction zone.

2. The process of claim 1, wherein a first composition, comprising ethylene, is fed to one reaction zone, and a second composition, comprising ethylene, is fed to another reaction zone.

3. The process of claim 2, wherein each composition further comprises CO.

4. The process of claim 3, wherein the "concentration of CO" in the second composition is at least 1.2 times the "concentration of CO" in the first composition.

5. The process of claim 1, wherein at least one reaction zone is operated at a maximum polymerization temperature from 305° C. to 340° C.

6. The process of claim 1, wherein an upstream reaction zone is operated at a maximum polymerization temperature that is at least 10° C. higher than the maximum polymerization temperature of a downstream reaction zone.

7. The process of claim 1, wherein the reactor configuration comprises at least one tubular reactor.

8. The process of claim 1, wherein the feed pressure to the first reaction zone is less than, or equal to, 250 MPa.

9. The process of claim 1, wherein the reactor comprises at least three reaction zones.

10. The process of claim 1, wherein at least one Rheology Modifying Agent is added to at least one reaction zone, and wherein the Rheology Modifying Agent is selected from the following i) through vi):

i) RMA 1:

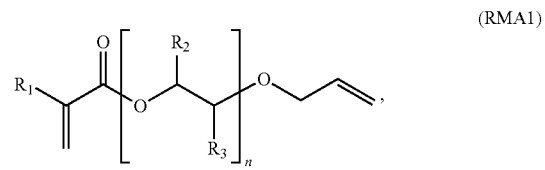

wherein, for RMA1, $R_1$ is H or alkyl; n is from 1 to 50; $R_2$ is selected from H or an alkyl; $R_3$ is selected from H or an alkyl;

ii) RMA2:

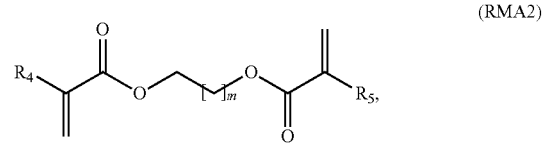

wherein, for RMA2, $R_4$ and $R_5$ are each independently H or an alkyl; m is from 1 to 50;

iii) RMA3:

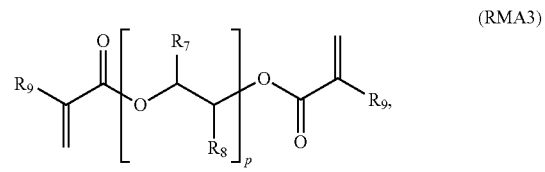

wherein, for RMA3, $R_6$ and $R_9$ are each independently H or an alkyl; p is from 1 to 50; $R_7$ is selected from H or an alkyl; $R_8$ is selected from H or an alkyl;

iv) RMA4:

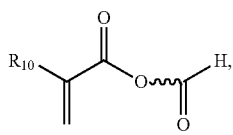
(RMA4)

wherein $R_{10}$ is hydrogen or an alkyl; the notation "〰" is a hydrocarbon chain comprising from 2 to 50 carbon atoms, and wherein the hydrocarbon chain is linear, branched, or comprises a saturated hydrocarbon ring structure;

v) RMA5:

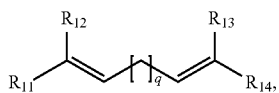
(RMA5)

wherein q is from 2 to 20; R11=H or alkyl; R12=H or alkyl; R13=H or alkyl; R14=H or alkyl; or vi) any combination of i) through v).

11. An ethylene-based polymer formed from the process of claim 1.

12. The ethylene-based polymer of claim 11, wherein the ethylene-based polymer comprises monomer units derived from Carbon Monoxide, and wherein the polymer comprises the following features:
   a) from 0.1 to 10 weight percent CO;
   b) melt index (2) from 1.0 to 50.0 g/10 min;
   c) G'≥162-90*Log(MI) where G' is measured at G"=500 Pa at 170° C.

13. A composition comprising the ethylene-based polymer of claim 12.

14. An article comprising at least component formed from the composition of claim 13.

* * * * *